US011341086B2

(12) United States Patent
Agrawal et al.

(10) Patent No.: US 11,341,086 B2
(45) Date of Patent: May 24, 2022

(54) COMPUTE ACCELERATOR WITH 3D DATA FLOWS

(71) Applicant: Rambus Inc., San Jose, CA (US)

(72) Inventors: Amogh Agrawal, West Lafayette, IN (US); Thomas Vogelsang, Mountain View, CA (US); Steven C. Woo, Saratoga, CA (US)

(73) Assignee: Rambus Inc., San Jose, CA (US)

( * ) Notice: Subject to any disclaimer, the term of this patent is extended or adjusted under 35 U.S.C. 154(b) by 0 days.

(21) Appl. No.: 17/093,227

(22) Filed: Nov. 9, 2020

(65) Prior Publication Data

US 2021/0157582 A1    May 27, 2021

Related U.S. Application Data

(60) Provisional application No. 62/939,508, filed on Nov. 22, 2019.

(51) Int. Cl.
*G06F 15/80*      (2006.01)

(52) U.S. Cl.
CPC ........ *G06F 15/803* (2013.01); *G06F 15/8046* (2013.01)

(58) Field of Classification Search
CPC ..... G06F 15/803; G06F 15/8046; G06F 15/80
USPC ..................................................... 712/19, 12
See application file for complete search history.

(56) References Cited

U.S. PATENT DOCUMENTS

| | | | | |
|---|---|---|---|---|
| 5,274,832 A | * | 12/1993 | Khan | G06N 3/10 708/424 |
| 8,924,455 B1 | * | 12/2014 | Barman | G06F 7/5443 708/607 |
| 9,063,667 B2 | | 6/2015 | Ancajas et al. | |
| 9,286,216 B2 | | 3/2016 | Franchetti et al. | |
| 10,146,738 B2 | | 12/2018 | Nurvitadhi et al. | |
| 10,180,928 B2 | | 1/2019 | Nurvitadhi et al. | |
| 10,203,878 B2 | | 2/2019 | Haller et al. | |

(Continued)

OTHER PUBLICATIONS

Linderman, R., and W. Ku. "A three dimensional systolic array architecture for fast matrix multiplication." ICASSP'84. IEEE International Conference on Acoustics, Speech, and Signal Processing. Vol. 9. IEEE, 1984. 4 pages. (Year: 1984).*
Ishihara, M., M. Tanaka, and K. Kuriyama. "A Cubic Systolic Array and its Properties." International Journal of Computers and Applications 30.3 (2008): pp. 173-182. (Year: 2008).*
Lim, Hyesook, and E. E. Swartzlander. "Multidimensional systolic arrays for multidimensional DFTs." 1996. IEEE International Conference on Acoustics, Speech, and Signal Processing Conference Proceedings. Vol. 6. IEEE, 1996. pp. 3276-3279 (Year: 1996).*

(Continued)

*Primary Examiner* — Keith E Vicary
(74) *Attorney, Agent, or Firm* — The Neudeck Law Firm, LLC

(57) ABSTRACT

An array of processing elements are arranged in a three-dimensional array. Each of the processing elements includes or is coupled to a dedicated memory. The processing elements of the array are intercoupled to their nearest neighbor processing elements. A processing element on a first die may be intercoupled to a first processing element on a second die that is located directly above the processing element, a second processing element on a third die that is located directly below the processing element, and the four adjacent processing elements on the first die. This intercoupling allows data to flow from processing element to processing element in the three directions. These dataflows are reconfigurable so that they may be optimized for the task. The data flows of the array may be configured into one or more loops that periodically recycle data in order to accomplish different parts of a calculation.

20 Claims, 18 Drawing Sheets

(56) References Cited

U.S. PATENT DOCUMENTS

| | | | |
|---|---|---|---|
| 10,324,644 B2 | 6/2019 | Ma et al. | |
| 2011/0131391 A1* | 6/2011 | Barowski | G06F 15/80 712/12 |
| 2013/0032950 A1* | 2/2013 | Ware | H01L 23/481 257/774 |
| 2014/0092728 A1* | 4/2014 | Alvarez-Icaza Rivera | H04L 41/0654 370/228 |
| 2014/0244971 A1* | 8/2014 | Alvarez-Icaza Rivera | G06F 13/4068 712/11 |
| 2016/0148901 A1* | 5/2016 | Alvarez-Icaza Rivera | H01L 27/11526 327/565 |
| 2018/0260360 A1* | 9/2018 | Samadi | G06F 12/0875 |
| 2018/0267936 A1* | 9/2018 | Chen | G06F 17/16 |
| 2019/0050717 A1* | 2/2019 | Temam | G06N 3/0481 |
| 2019/0057060 A1* | 2/2019 | Nicol | G06N 3/08 |
| 2019/0079801 A1* | 3/2019 | Lyuh | G06F 9/30101 |
| 2019/0123023 A1* | 4/2019 | Teig | H01L 25/0657 |
| 2019/0370639 A1* | 12/2019 | Yu | G11C 11/54 |

OTHER PUBLICATIONS

Aaron Harlap et al. "PipeDream: Fast and Efficient Pipeline Parallel DNN Training", arXiv: 1806.03377v1 Microsoft Research, Carnegie Mellon, University Stanford University, Jun. 8, 2018. 14 pages.

Duckhwan Kim et al., "NeuroCube: A Programmable Digital Neuromorphic Architecture with High-Density 3D Memory", School of Electrical and Computer Engineering, Georgia Institute of Technology, ACM SIGARCH Computer Architecture News, Jun. 2016. 36 pages.

H.T Kung et al., "Mapping Systolic Arrays Onto 3D Circuit Structures: Accelerating Convolutional Neural Network Inference", in the proceedings of IEEE Workshop on Signal Processing Systems (SiPS), Oct. 2018. 7 pages.

Qiuling Zhu et al, "A 3D-Stacked Logic-in-Memory Accelerator for Application-Specific Data Intensive Computing", 978-1-4673-6484-3/13, IEEE, 2013. 7 pages.

Salim Lakhani et al., "2D matrix multiplication on a 3D systolic array", Microelectronics Journal 27 (1996) 11-22, 1996 Elsevier Science Limited. 12 pages.

* cited by examiner

```
┌─────────────────────────────────────────┐
│  PROVIDE FIRST DATA TO A FIRST PROCESSING│
│  ELEMENT OF A THREE-DIMENSIONAL ARRAY OF │
│     NEAREST NEIGHBOR INTERCOUPLED        │
│          PROCESSING ELEMENTS             │
│                   802                    │
└─────────────────────────────────────────┘
                     │
┌─────────────────────────────────────────┐
│      PROVIDE SECOND DATA TO A SECOND     │
│    PROCESSING ELEMENT OF THE ARRAY, THE  │
│    SECOND PROCESSING ELEMENT ADJACENTLY  │
│    INTERCOUPLED TO THE FIRST PROCESSING  │
│         ELEMENT IN A FIRST DIMENSION     │
│                   804                    │
└─────────────────────────────────────────┘
                     │
┌─────────────────────────────────────────┐
│  PROVIDE, BY THE FIRST PROCESSING ELEMENT,│
│    THE FIRST DATA TO A THIRD PROCESSING  │
│  ELEMENT OF THE ARRAY, THE THIRD PROCESSING│
│   ELEMENT ADJACENTLY INTERCOUPLED TO THE │
│      FIRST PROCESSING ELEMENT IN A SECOND│
│  DIMENSION, THE FIRST DATA FLOWING FROM THE│
│    FIRST PROCESSING ELEMENT TO THE THIRD │
│   PROCESSING ELEMENT IN A FIRST DIRECTION│
│           ALONG THE SECOND DIMENSION     │
│                   806                    │
└─────────────────────────────────────────┘
                     │
┌─────────────────────────────────────────┐
│   PROVIDE, BY A FOURTH PROCESSING ELEMENT,│
│     THIRD DATA TO THE SECOND PROCESSING  │
│      ELEMENT OF THE ARRAY, THE FOURTH    │
│       PROCESSING ELEMENT ADJACENTLY      │
│  INTERCOUPLED TO THE SECOND PROCESSING   │
│  ELEMENT IN THE SECOND DIMENSION, THE THIRD│
│   DATA FLOWING FROM THE FOURTH PROCESSING│
│  ELEMENT TO THE SECOND PROCESSING ELEMENT│
│    IN A SECOND DIRECTION ALONG THE SECOND│
│     DIMENSION, THE FIRST DIRECTION BEING │
│       OPPOSITE TO THE SECOND DIRECTION   │
│                   808                    │
└─────────────────────────────────────────┘
```

*FIG. 8*

```
┌─────────────────────────────────────┐
│  PROVIDE FIRST DATA TO A FIRST PROCESSING  │
│  ELEMENT OF A THREE-DIMENSIONAL ARRAY OF   │
│  NEAREST NEIGHBOR INTERCOUPLED             │
│  PROCESSING ELEMENTS                       │
│  902                                       │
└─────────────────────────────────────┘
                  │
┌─────────────────────────────────────┐
│  PROVIDE SECOND DATA TO A SECOND           │
│  PROCESSING ELEMENT OF THE ARRAY, THE      │
│  SECOND PROCESSING ELEMENT ADJACENTLY      │
│  INTERCOUPLED TO THE FIRST PROCESSING      │
│  ELEMENT IN A FIRST DIMENSION              │
│  904                                       │
└─────────────────────────────────────┘
                  │
┌─────────────────────────────────────┐
│  CONFIGURING THE FIRST PROCESSING ELEMENT  │
│  TO PROVIDE THE FIRST DATA TO A THIRD      │
│  PROCESSING ELEMENT OF THE ARRAY IN A FIRST│
│  DIRECTION ALONG A SECOND DIMENSION, THE   │
│  THIRD PROCESSING ELEMENT ADJACENTLY       │
│  INTERCOUPLED TO THE FIRST PROCESSING      │
│  ELEMENT IN THE SECOND DIMENSION           │
│  906                                       │
└─────────────────────────────────────┘
                  │
┌─────────────────────────────────────┐
│  CONFIGURING A FOURTH PROCESSING ELEMENT   │
│  TO PROVIDE THIRD DATA TO THE SECOND       │
│  PROCESSING ELEMENT OF THE ARRAY IN A      │
│  SECOND DIRECTION ALONG THE SECOND         │
│  DIMENSION, THE FIRST DIRECTION BEING      │
│  OPPOSITE TO THE SECOND DIRECTION, THE     │
│  FOURTH PROCESSING ELEMENT ADJACENTLY      │
│  INTERCOUPLED TO THE SECOND PROCESSING     │
│  ELEMENT IN THE SECOND DIMENSION           │
│  908                                       │
└─────────────────────────────────────┘
```

*FIG. 9*

COMPUTE ACCELERATOR WITH 3D DATA FLOWS

BRIEF DESCRIPTION OF THE DRAWINGS

FIG. 8 is a flowchart illustrating a method of operating a three-dimensional array of processing elements.

FIG. 9 is a flowchart illustrating a method of configuring data flows for a three-dimensional array of processing elements.

DETAILED DESCRIPTION OF THE EMBODIMENTS

In an embodiment, an array of processing elements are arranged in a three-dimensional array. Each of the processing elements includes or is coupled to a dedicated memory. The processing elements of the array are intercoupled to the nearest neighbor processing elements. Thus, a processing element on a first die may be intercoupled to a first processing element on a second die that is located directly above the processing element, a second processing element on a third die that is located directly below the processing element, and the four adjacent processing elements on the first die.

The nearest neighbor intercoupling allows data to flow from processing element to processing element in the three directions (e.g., up or down, left or right, and toward the front or toward the back.) These dataflows are reconfigurable so that they may be optimized for the task (e.g., matrix multiplication) and/or workload (e.g., size of matrices.) Thus, for example, the data flows of the array may be configured into one or more loops that periodically recycle data in order to accomplish different parts of a calculation.

In addition, each processing element may include or be coupled to a relatively large local (to that processing element) memory. This arrangement includes a dataflow that may be optimized for neural networks and/or large matrix multiplication. For example, when calculating a fully connected layer, inputs to that layer may be received from one or more adjacent processing elements and outputs provided to other adjacent processing elements. To switch the model being processed, neural network model parameters (e.g., weights, biases, learning rate, etc.) may be relatively quickly swapped into the processing element from the local memory rather than being provided by an adjacent processing element. Likewise, intermediate results (e.g., for a neural network calculation or large matrix calculation) may be stored and retrieved relatively quickly to or from the local memory.

Figure 1:
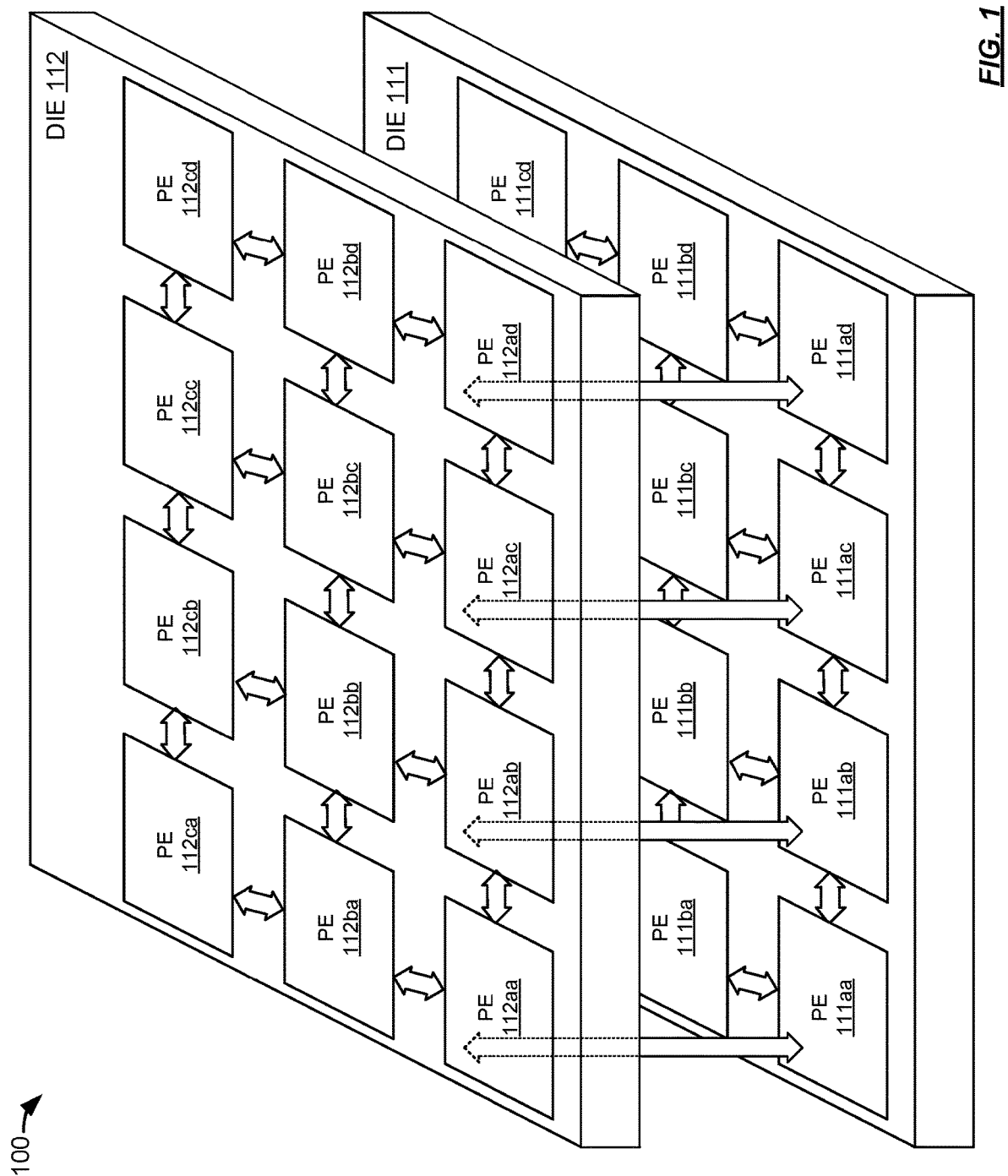
FIG. 1 is an isometric illustration of a three-dimensional array of processing elements.

FIG. 1 is an isometric illustration of a three-dimensional array of processing elements. In FIG. 1, processing system 100 comprises integrated circuit die 111 and integrated circuit die 112. Integrated circuit die 112 is stacked on top of integrated circuit die 111. Integrated circuit die 111 includes a two-dimensional array with 3 rows and 4 columns of processing elements 111aa-111cd. Note that in FIG. 1, processing elements 111ca-111cc are obscured by integrated circuit die 112 and are therefore not visible in FIG. 1. Integrated circuit die 112 includes a two-dimensional array with 3 rows and 4 columns of processing elements 112aa-112cd. It should be understood that the selection of 3 rows and 4 columns is merely for the purposes of illustration. Any number of rows and/or columns are contemplated.

In processing system 100, each processing element 111aa-111cd of integrated circuit die 111 is intercoupled to its nearest neighbors in the left and right directions and the front and back directions. This forms a two-dimensional processing array on integrated circuit die 111. The intercoupling may comprise intercoupling circuitry that includes, but is not limited to, input and/or output (I/O) circuitry, buffer circuitry, parallel buses, serial busses, through-silicon via (TSV) connections, and the like. Likewise, each processing element 112aa-112cd of integrated circuit die 112 is intercoupled to its nearest neighbors in the left and right directions and the front and back directions. This forms a two-dimensional processing array on integrated circuit die 112.

Thus, for example, processing element 112bb lies between processing element 112ba and processing element 112bc in the left and right directions. Processing element 112bb is therefore intercoupled with both processing element 112ba and processing element 112bc. Processing element 112bb also lies between processing element 112cb and processing element 112ab in the front and back directions. Processing element 112bb is therefore intercoupled with both and is intercoupled with processing element 112cb and processing element 112ab. This pattern of being intercoupled with the respective adjacent left-to-right (if present) and front-to-back (if present) processing elements 111aa-111cd 112aa-112cd is repeated for each processing element 111aa-111cd 112aa-112cd.

In an embodiment, processing elements 111aa-111cd and processing elements 112aa-112cd have the same size such that each processing element 111aa-111cd on integrated circuit die 111 lies below a respective processing element 112aa-112cd on integrated circuit die 112. Each processing element 111aa-111cd is also intercoupled with the corresponding processing element 112aa-112cd that is above (or below) that respective processing element 111aa-111cd. In other words, processing element 111aa lies directly below processing element 112aa and is intercoupled with processing element 112aa; processing element 11 lab lies directly below processing element 112ab and is intercoupled with processing element 112ab, and so on. This vertical intercoupling is illustrated in FIG. 1 by the bidirectional arrows running from processing elements 111aa-111ad on integrated circuit die 111 to corresponding processing elements 112aa-112ad on integrated circuit die 112. It should be understood that processing elements 111ba-111bd on integrated circuit die 111 are intercoupled to corresponding processing elements 112*ba*-112*bd* on integrated circuit die 112. However, these arrows have been omitted from FIG. 1 because integrated circuit die 112 is obscuring them in the isometric view of FIG. 1.

It should be understood that, for the sake of brevity and clarity, only two dies 111-112 are illustrated in FIG. 1. One or more additional dies, with additional two-dimensional arrays of processing elements, may be stacked with dies 111-112 and intercoupled with processing elements 111*aa*-111*cd* and/or 112*aa*-112*cd* in a like manner. These additional dies may form additional layers of two-dimensional processing arrays so that the resulting three-dimensional processing array has more than two layers in the vertical direction. Thus, it should be understood that processing elements 111*aa*-111*cd* and processing elements 112*aa*-112*cd* form an array having a three-dimensional arrangement.

Each processing element 111*aa*-111*cd* 112*aa*-112*cd* has associated memory which may be DRAM or SRAM (not shown in FIG. 1.) In an embodiment, processing elements 111*aa*-111*cd* 112*aa*-112*cd* include both processing logic and the associated memory on the same die. In another embodiment, processing elements 111*aa*-111*cd* 112*aa*-112*cd* have the processing logic on a first die that is stacked with a second die that includes the associated memory (e.g., DRAM.) In another embodiment, processing elements 111*aa*-111*cd* 112*aa*-112*cd* include both processing logic and a first associated memory on the first die that is stacked with a second die that includes a second associated memory (e.g., DRAM.)

Figure 2:
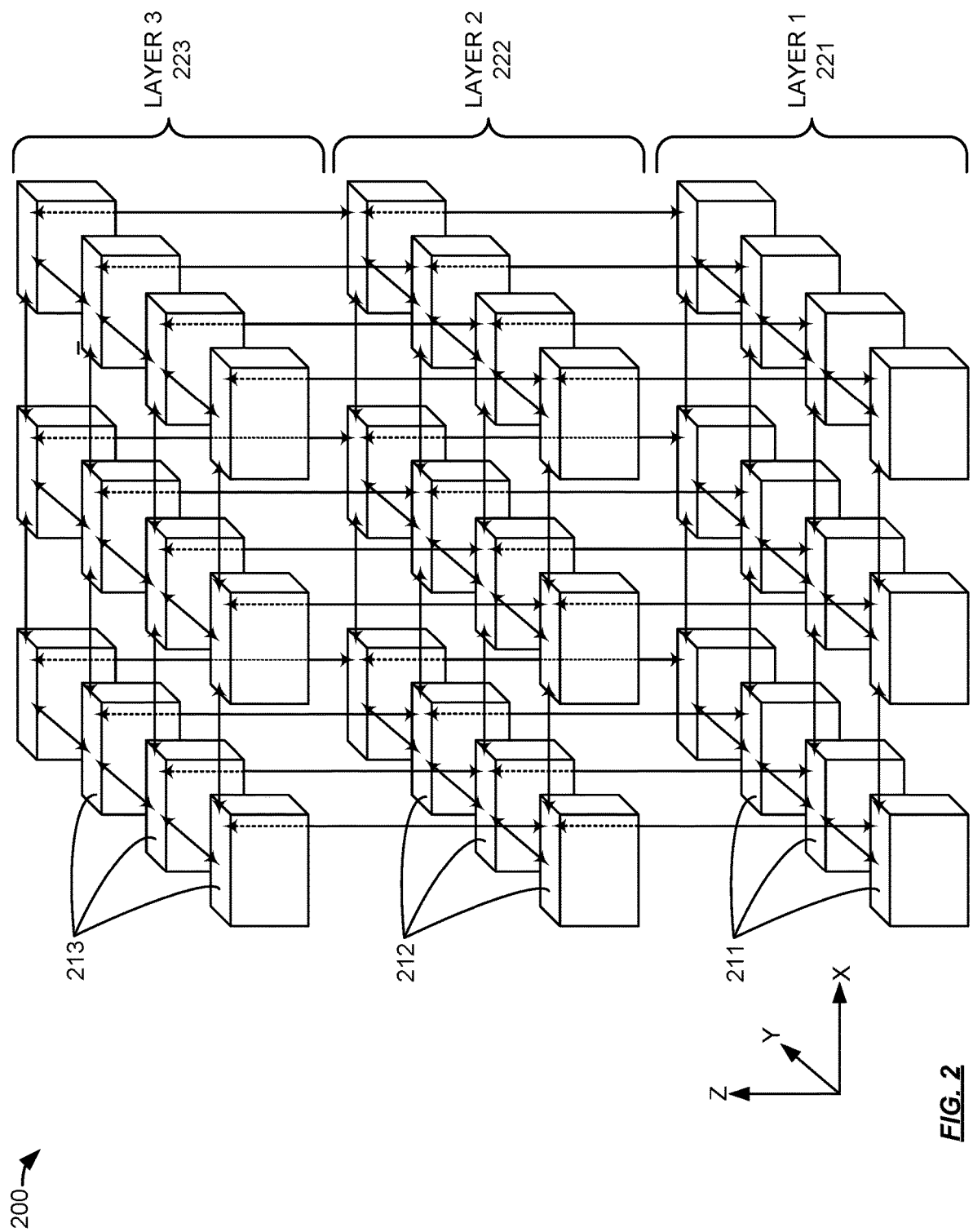
FIG. 2 is an illustration of nearest neighbor intercoupled processing elements.

FIG. 2 is an illustration of nearest neighbor intercoupled processing elements. In FIG. 2, system 200 comprises a three-dimensional array of processing elements 211-213. The three-dimensional array is illustrated by layers 221-223 in the vertical (Z) direction. Each layer 221-223 is illustrated as a two-dimensional array of processing elements laid out in the left-to-right (X) direction and the front-to-back (Y) direction. In an embodiment, each layer 221-223 is implemented by one or more integrated circuit dies (e.g., dies 111-112) that include the two-dimensional arrays of processing elements 211-213.

The processing elements 211-213 are each intercoupled to their nearest neighbor processing elements. This is illustrated in FIG. 2 by the arrows running from a given processing element to its nearest adjacent (in the X, Y, and Z directions) processing elements, if present. It should be understood that processing elements 211-213 that are at an edge, top, or bottom, of the three-dimensional array will lack at least one adjacent processing element in at least one direction (i.e., in at least one of the X, Y, and Z directions.) It should be understood that layers 221-223 form an array of processing elements 211-213 having a three-dimensional arrangement.

Figure 3A:
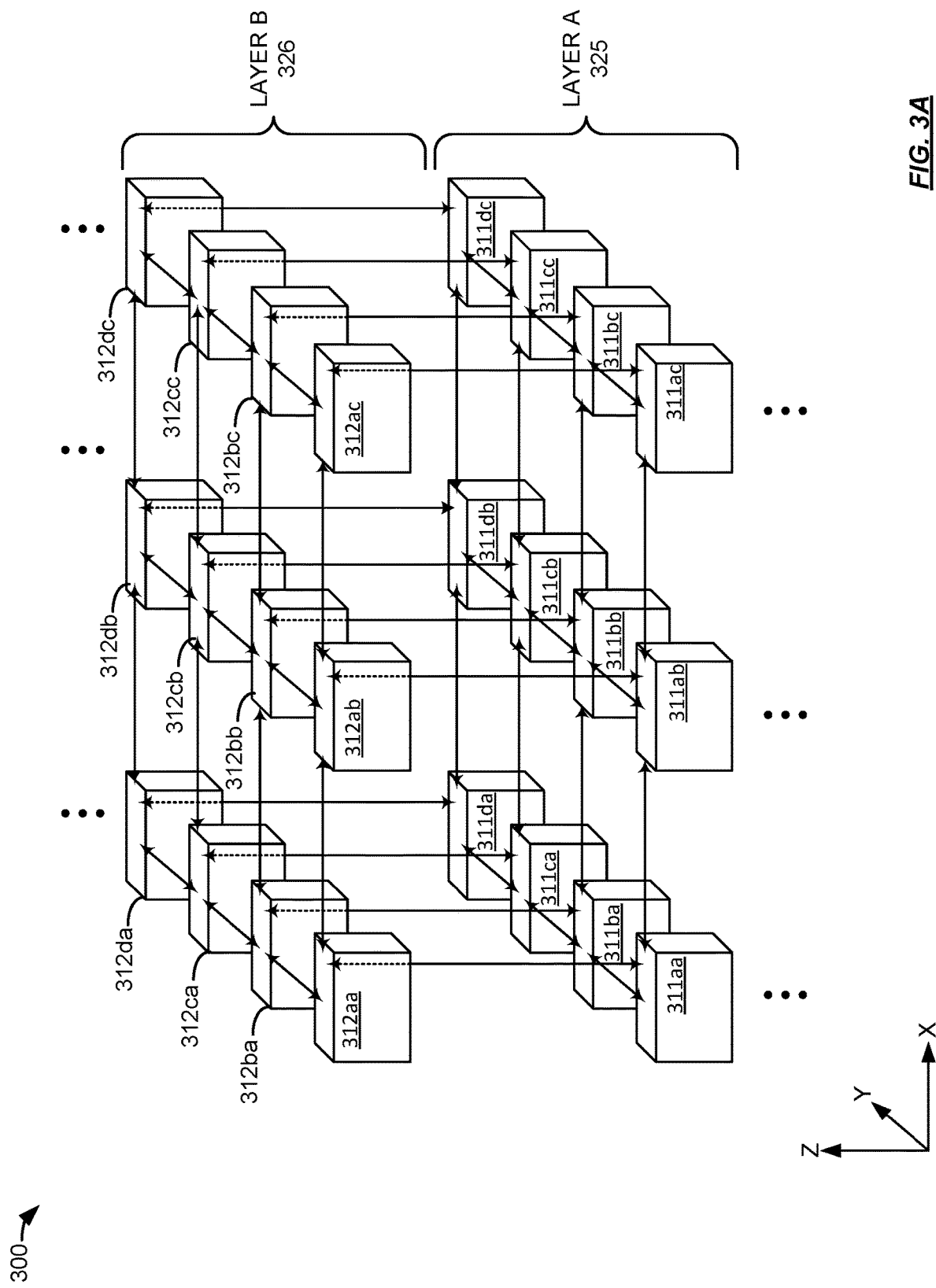
FIG. 3A illustrates two layers of nearest neighbor intercoupled processing elements.

FIG. 3A illustrates two layers of nearest neighbor intercoupled processing elements. In FIG. 3A, processing element array 300 includes processing elements 311*aa*-311*dc* and 312*aa*-312*dc*. Processing elements 311*aa*-311*dc* are arranged in a two-dimensional array on a first layer A 325. Processing elements 312*aa*-312*dc* are arranged in a two-dimensional array on a second layer B 326. It should be understood that processing elements 311*aa*-311*dc* and 312*aa*-312*dc* are part of a larger three-dimensional processing element array 300 that may include additional layers 325-326 as well as additional rows and/or columns of processing elements 311*aa*-311*dc* and 312*aa*-312*dc* on each layer. Each processing element 311*aa*-311*dc* and 312*aa*-312*dc* is intercoupled with its nearest adjacent processing element in the X, Y, and Z directions (if present.)

Figure 3B:
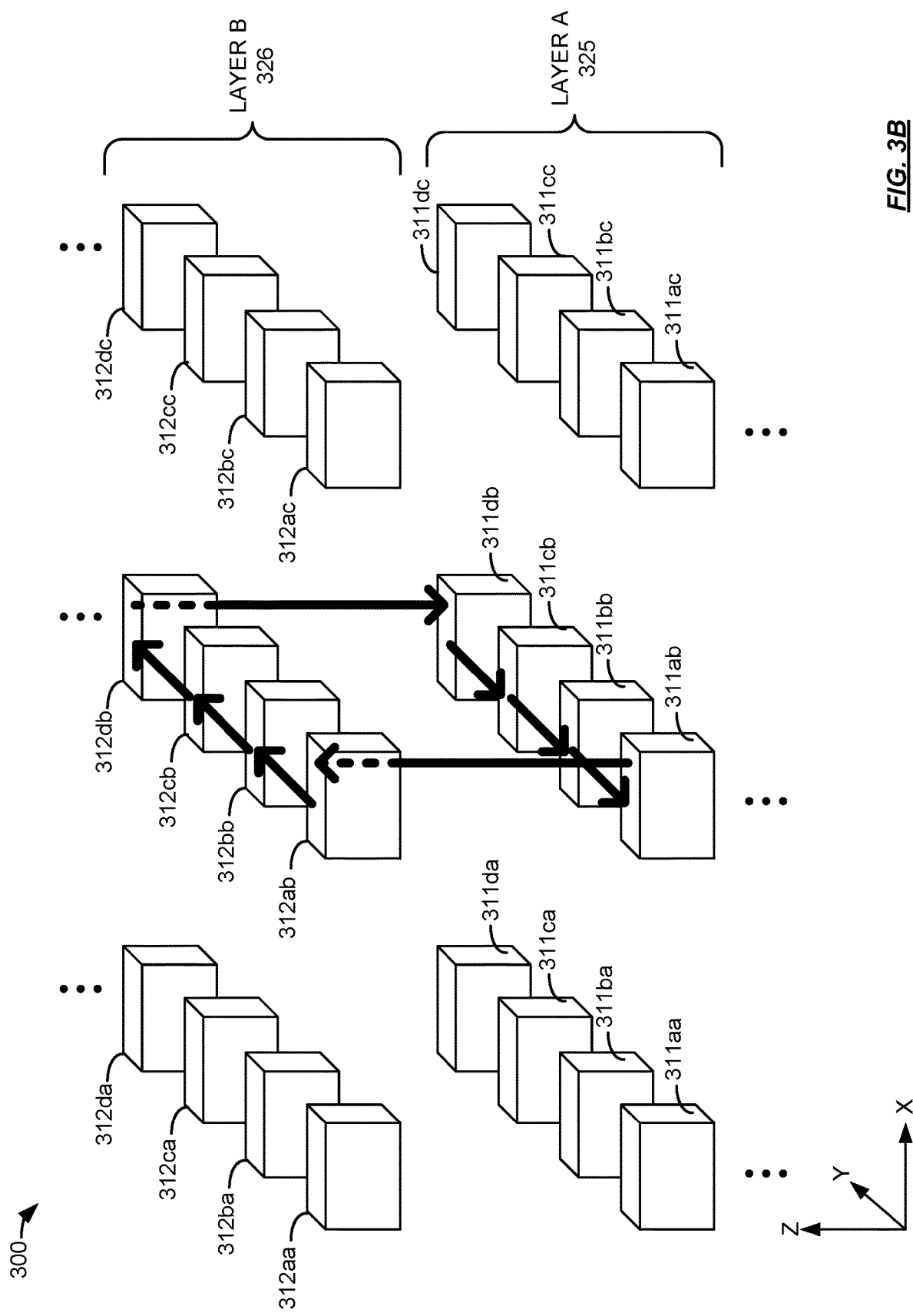
FIG. 3B illustrates a first example looped data flow.

FIG. 3B illustrates a first looped data flow. In FIG. 3B, data flows from processing element 311*ab* to processing element 312*ab* using the vertical (Z direction) intercoupling between them. Data flows from processing element 312*ab* to processing element 312*bb* using the front-to-back (Y direction) intercoupling between them. Data also flows from processing element 312*bb* to processing element 312*cb*, and from processing element 312*cb* to processing element 312*db* using Y direction intercoupling. Data flows from processing element 312*db* to processing element 311*db* using the vertical (Z direction) intercoupling between them. Data flows from processing element 311*db* to processing element 311*cb* using the front-to-back (Y direction) intercoupling between them. Data also flows from processing element 311*cb* to processing element 311*bb*, and from processing element 311*bb* to processing element 311*ab* using Y direction intercoupling.

Thus, a looped data flow on the Y-Z plane is formed. This loop is illustrated in FIG. 3B by the arrows from and to each of processing elements 311*ab*-311*db* and 312*ab*-312*db* and a respective adjacent processing element 311*ab*-311*db* and 312*ab*-312*db*. It should be understood that similar looped data flows on the Y-Z plane can be configured using other processing elements (e.g., processing elements 311*aa*-311*da*, 312*aa*-312*da*, 311*ac*-311*dc*, 312*ac*-312*dc*.) However, for the sake of the clarity of FIG. 3B, these flows are not illustrated in FIG. 3B.

Figure 3C:
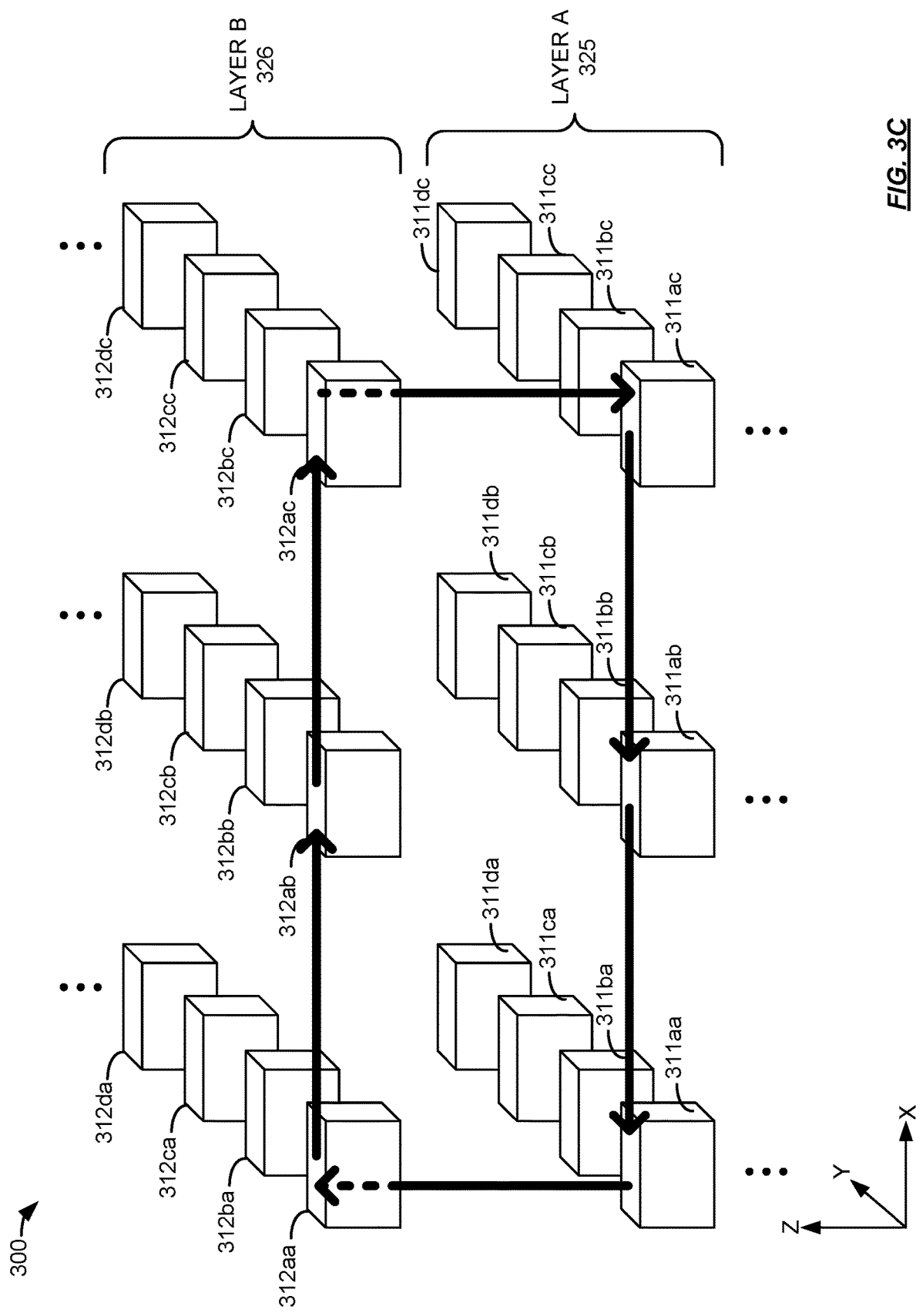
FIG. 3C illustrates a second example looped data flow.

FIG. 3C illustrates a second example looped data flow. In FIG. 3C, data flows from processing element 311*aa* to processing element 312*aa* using the vertical (Z direction) intercoupling between them. Data flows from processing element 312*aa* to processing element 312*ab* using the left-to-right (X direction) intercoupling between them. Data also flows from processing element 312*ab* to processing element 312*ac*. Data flows from processing element 312*ac* to processing element 311 *ac* using the vertical (Z direction) intercoupling between them. Data flows from processing element 311*ac* to processing element 311*ab* using the left-to-right (X direction) intercoupling between them. Data also flows from processing element 311*ab* to processing element 311*aa* using X direction intercoupling.

Thus, a looped data flow on the X-Z plane is formed. This loop is illustrated in FIG. 3C by the arrows from and to each of processing elements 311*aa*-311*ac* and 312*aa*-312*ac* and a respective adjacent processing element 311*aa*-311*ac* and 312*aa*-312*ac*. It should be understood that similar looped data flows on the X-Z plane can be configured using other processing elements. However, for the sake of the clarity of FIG. 3C, these flows are not illustrated in FIG. 3C.

Figure 3D:
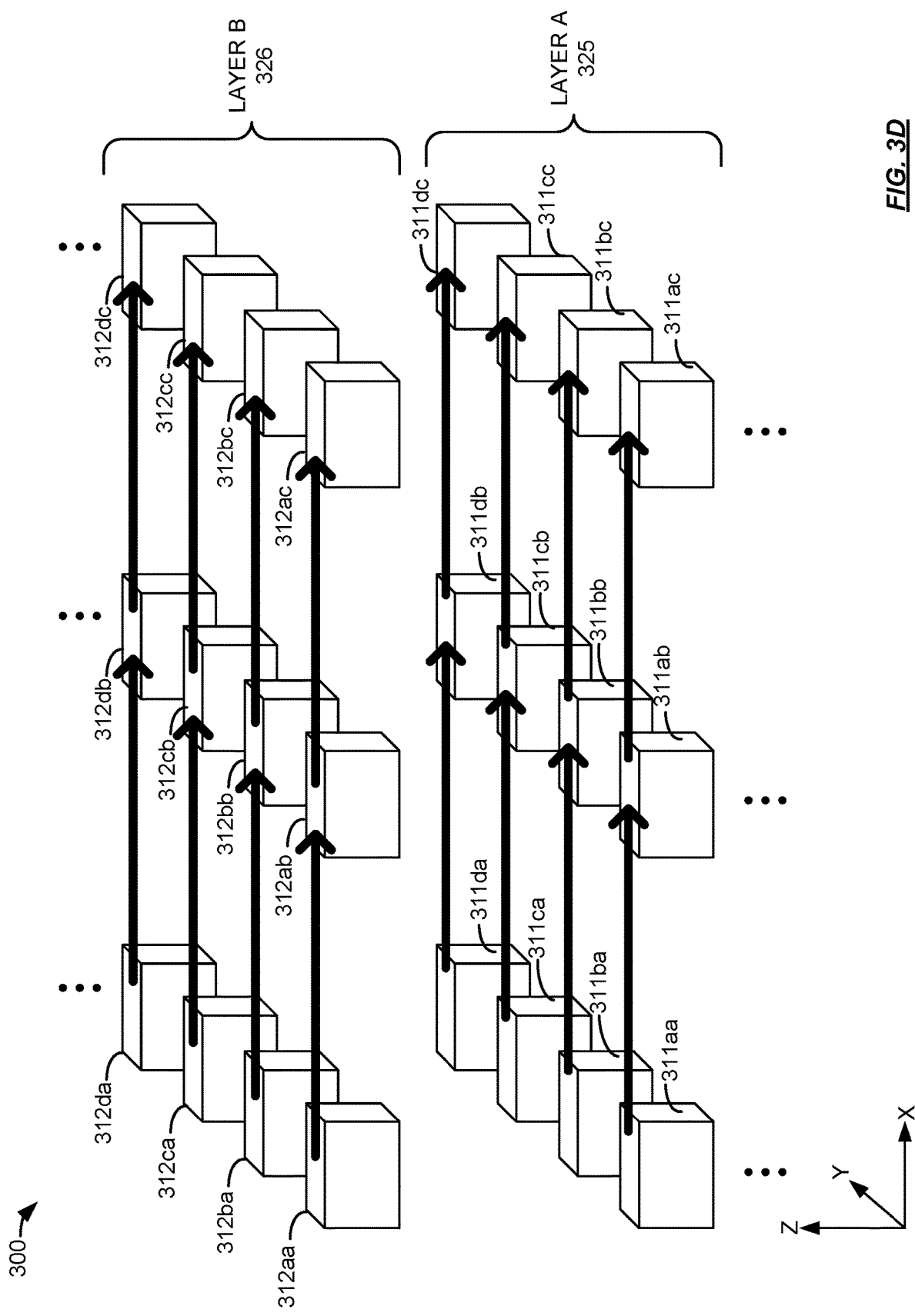
FIG. 3D illustrates example data flows to accumulate partial results.

FIG. 3D illustrates example data flows to accumulate partial results. In FIG. 3D, data flows from processing element 311*aa* to processing element 311*ab* using the left-to-right (X direction). This data may be a partial result calculated by processing element 311*aa*. Processing elements 311*ab* receives data from processing element 311*aa*, operates on it or otherwise uses the data, and flows data to processing element 311*ac*. Processing element 311*ac* may operate on or otherwise use the received data, and flow data to another processing element not illustrated in FIG. 3D. Similar left-to-right (X direction) data flows are illustrated for the sets of processing elements 311*ba*-311*bc*, 311*ca*-311*cc*, 311*da*-311*dc*, 312*aa*-312*ac*, 312*ba*-312*bc*, 312*ca*-312*cc*, and 312*da*-312*dc*. However, for the sake of brevity, these will not be described herein in detail.

Figure 3E:
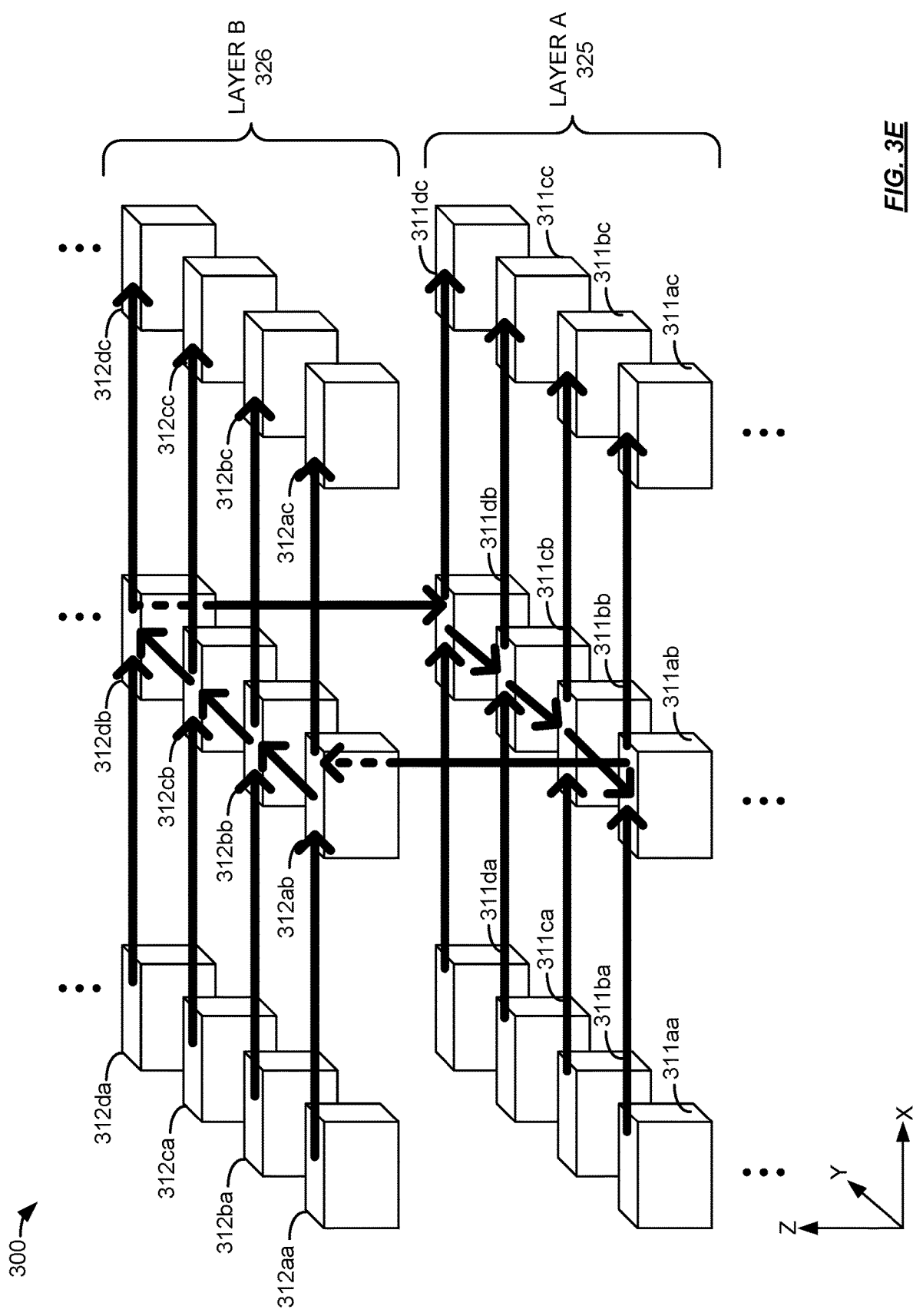
FIG. 3E illustrates example data flows to loop data and accumulate partial results.

FIG. 3E illustrates example data flows to loop data and accumulate partial results. It should be understood that the data flows illustrated in FIG. 3E are a combination of the data flows illustrated in FIG. 3B and FIG. 3D. Thus, it should be further understood that combinations of data flows in the various planes (i.e., XY, YZ, XZ) and/or various directions (X, Y, Z, clockwise, and/or counterclockwise) may be combined in various ways to facilitate efficient computation.

Figure 4:
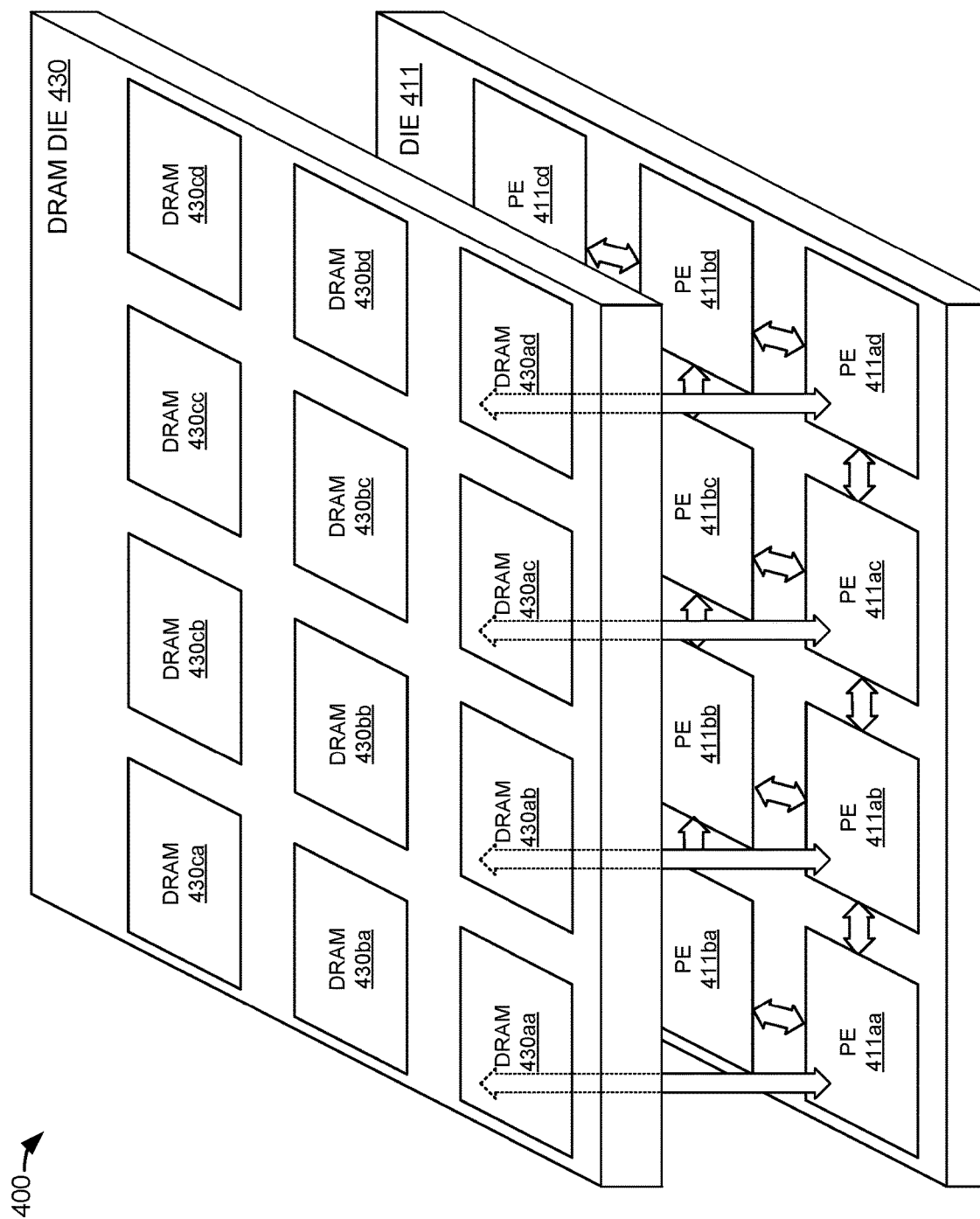
FIG. 4 is an isometric illustration of a processing element die stacked with a DRAM die.

FIG. 4 is an illustration of a processing element die stacked with a DRAM die. In FIG. 4, processing system 400 comprises integrated circuit die 411 and DRAM integrated circuit die 430. DRAM integrated circuit die 430 is stacked on top of integrated circuit die 411. Integrated circuit die 411 includes a two-dimensional array with 3 rows and 4 columns of processing elements 411aa-411cd. Note that in FIG. 4, processing elements 411ca-411cc are obscured by DRAM integrated circuit die 430 and are therefore not visible in FIG. 4. DRAM integrated circuit die 430 includes a two-dimensional array with 3 rows and 4 columns of memory circuits 430aa-430cd. It should be understood that the selection of 3 rows and 4 columns is merely for the purposes of illustration. Any number of rows and/or columns are contemplated.

In processing system 400, each processing element 411aa-411cd of integrated circuit die 411 is intercoupled to its nearest neighbors in the left and right directions and the front and back directions. This forms a two-dimensional processing array on integrated circuit die 411.

In an embodiment, processing elements 411aa-411cd and memory circuits 430aa-430cd have approximately or substantially the same size such that each processing element 411aa-411cd on integrated circuit die 411 lies below a respective memory circuit 430aa-430cd on DRAM integrated circuit die 430. Each processing element 411aa-411cd is also intercoupled with the corresponding memory circuit 430aa-430cd that is above (or in some embodiments may be below) that respective processing element 411aa-411cd. In other words, processing element 411aa lies directly below memory circuit 430aa and is intercoupled with memory circuit 430aa; processing element 41 lab lies directly below memory circuit 430ab and is intercoupled with memory circuit 430ab, and so on. This vertical intercoupling is illustrated in FIG. 4 by the bidirectional arrows running from processing elements 411aa-411ad on integrated circuit die 411 to corresponding memory circuits 430aa-430ad on DRAM integrated circuit die 430. It should be understood that processing elements 411ba-411bd on integrated circuit die 411 are intercoupled to corresponding memory circuits 430ba-430bd on DRAM integrated circuit die 430. However, these arrows have been omitted from FIG. 4 because DRAM integrated circuit die 430 is obscuring them in the isometric view of FIG. 4.

It should be understood that, for the sake of brevity and clarity, only two integrated circuit dies 411 and 430 are illustrated in FIG. 4. One or more additional dies, with additional two-dimensional arrays of processing elements and/or memory circuits, may be stacked with integrated circuit dies 411 and 430 and intercoupled with processing elements 411aa-411cd and/or memory circuits 430aa-430cd in a like manner. These additional dies may form additional layers of two-dimensional processing arrays so that the resulting three-dimensional processing array has more than one processing layer in the vertical direction. In an embodiment, processing elements 411aa-411cd include both processing logic and at least one associated memory on the same die.

Figure 5A:
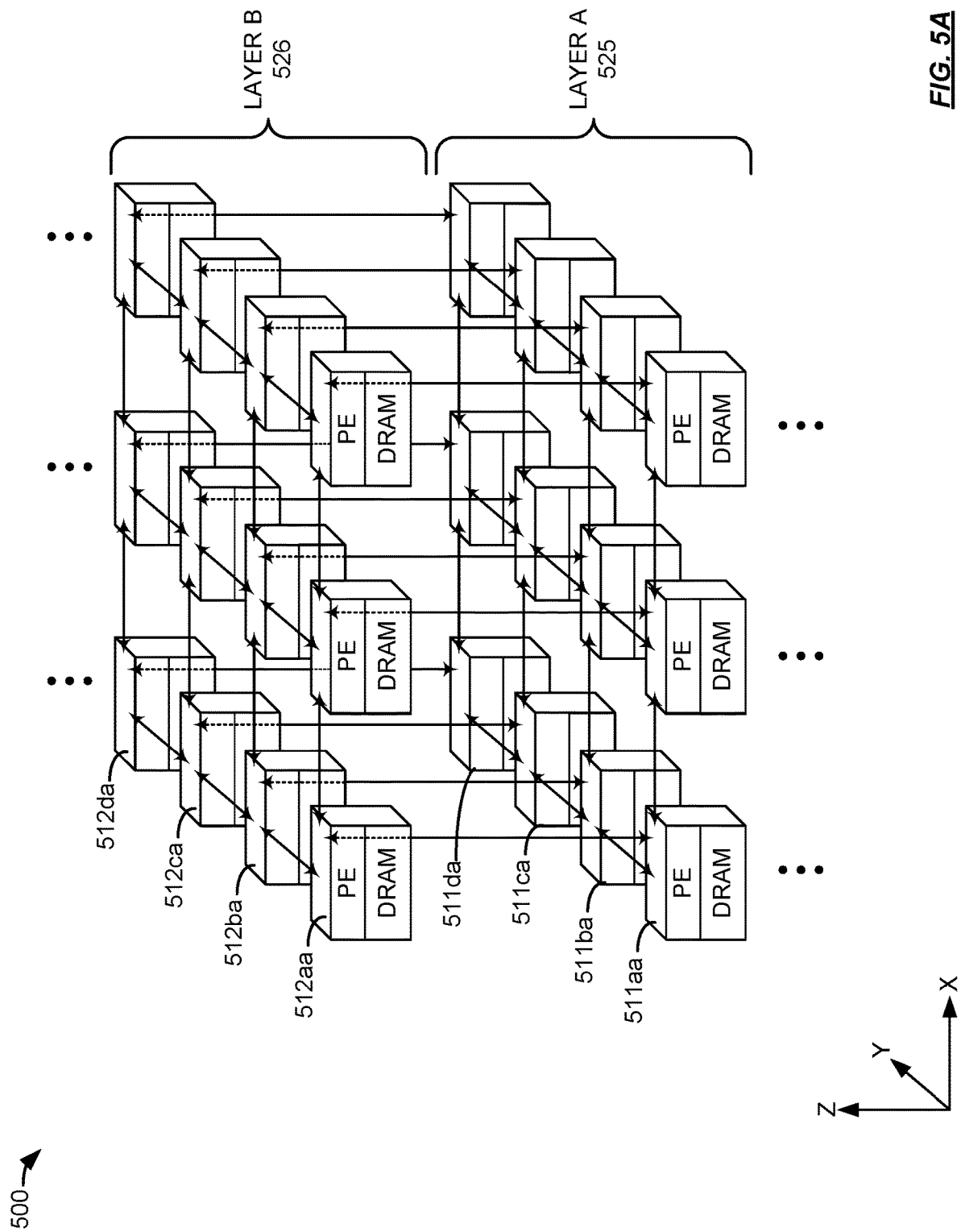
FIG. 5A illustrates a three-dimensional array of stacked processing element-DRAM assemblies.

FIG. 5A illustrates a three-dimensional array of stacked processing element-DRAM assemblies. In FIG. 5A, processing element array 500 includes processing assemblies 511aa-511da and 512aa-512da. Processing assemblies are arranged in a two-dimensional array on a first layer A 525. Processing assemblies are arranged in a two-dimensional array on a second layer B 526. It should be understood that the processing assemblies on layer A 525 and layer B 526 are part of a larger three-dimensional processing element array 500 that may include additional layers 525-526 as well as additional rows and/or columns of processing assemblies 511aa-511da and 512aa-512da on each layer. Each processing assembly 511aa-511da and 512aa-512da is intercoupled with its nearest adjacent processing element in the X, Y, and Z directions (if present.)

Figure 5B:
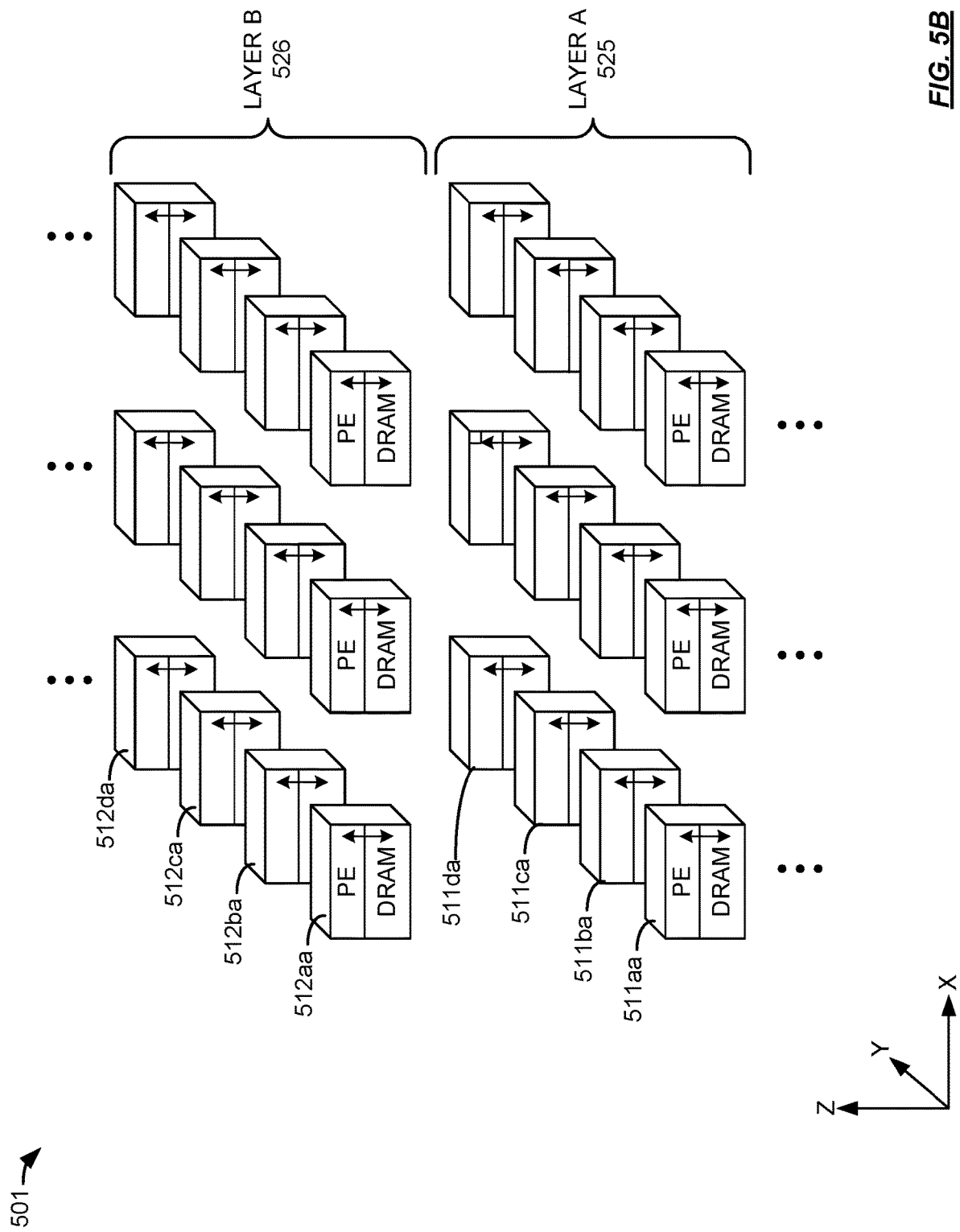
FIG. 5B illustrates additional data flows for a three-dimensional array of stacked processing element-DRAM assemblies.

FIG. 5B illustrates additional data flows for three-dimensional array of stacked processing element-DRAM assemblies. In FIG. 5B, processing element array 501 includes processing assemblies 511aa-511da and 512aa-512da. Like FIG. 5A, processing assemblies on layer A 525 and layer B 526 in FIG. 5B are part of a larger three-dimensional processing element array 501 that may include additional layers 525-526 as well as additional rows and/or columns of processing assemblies 511aa-511da and 512aa-512da on each layer. In FIG. 5B, data flowing to/from the DRAM portion of a processing assembly 511aa-511da and 512aa-512da from/to the processing portion of a respective processing assembly 511aa-511da and 512aa-512da is illustrated. These data flows may be in addition, and/or be performed concurrently with, the other data flows described and illustrated herein with reference to other Figures (e.g., FIG. 5A, FIGS. 7A-7D.)

Because the data flows illustrated in FIG. 5 are local to a respective processing element assembly 511aa-511da and 512aa-512da, these data flows are well adapted for neural network parameters (e.g., weights, biases, learning rate, etc.) and/or intermediate results (e.g., from a large neural network calculation and/or large matrix multiplication that is too large to be computed by processing array 501 in one pass.) In particular, because these data flows are local to each processing element assembly 511aa-511da and 512aa-512da, these data flows are well adapted to changing the neural network model being calculated by processing array 501 by obtaining the new neural network parameters from the DRAM portion of a respective processing element assembly 511aa-511da and 512aa-512da rather than another source that is not local to the processing element assembly 511aa-511da and 512aa-512da. This can help solve the problem where more time is spent loading neural network model parameters than is spent calculating the neural network outputs (a.k.a., batch size equals "1" problem.)

Figure 6:
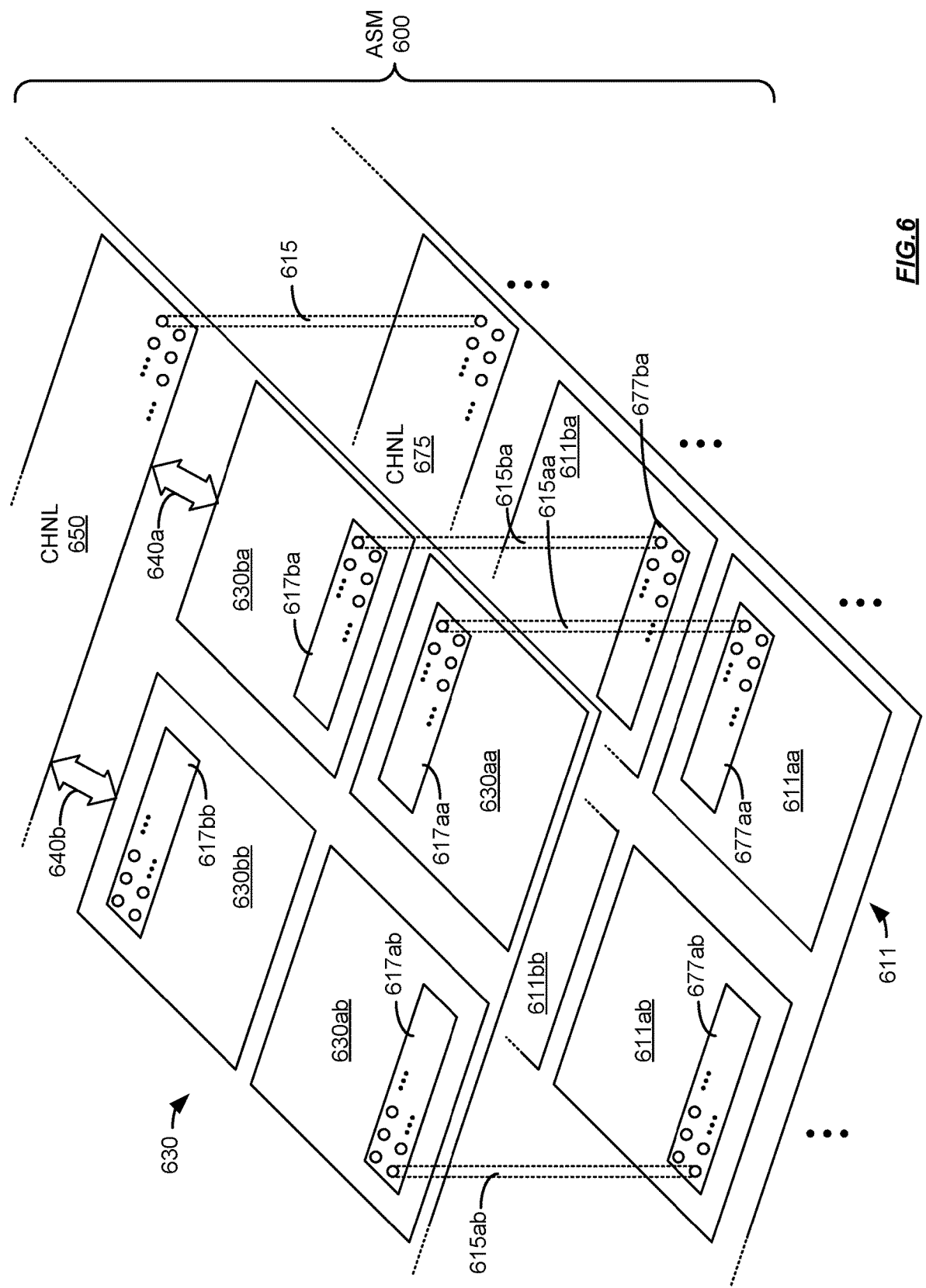
FIG. 6 illustrates a stacked assembly of DRAM and processing element die.

FIG. 6 illustrates a stacked assembly of DRAM and processing element die. FIG. 6 is an isometric, exploded view, illustration of an example stacked processing element-DRAM assembly. In FIG. 6, assembly 600 includes processing die 611 stacked with at least one DRAM die 630. Processing die 611 includes channel connections 675 (e.g., TSVs), and processing elements 611aa-611bb. Processing elements 611aa-611bb include and/or are coupled to TSV connections 677aa-677bb, respectively. In an embodiment, channel connections 675 of processing die 611 are connection compatible with a High Bandwidth Memory (HBM) standard.

DRAM die 630 includes channel connections 650 (e.g., TSVs) and DRAM blocks 630aa-630bb. A DRAM block is one or more mats of DRAM bit cells with the sense amplifiers, row and column decoders and drivers and other circuitry necessary to connect a DRAM block with external logic and other DRAM blocks. A DRAM block might be a DRAM bank or part of a DRAM bank. DRAM blocks 630aa-630bb include and/or are coupled to TSV connections 617aa-617bb, respectively. In an embodiment, channel connections 650 of DRAM die 630 are connection compatible with an HBM standard.

TSV connections 617aa, 617ab, and 617ba of DRAM blocks 630aa, 630ab, and 630ba of DRAM die 630 are aligned with TSV connections 677aa, 677ab, and 677ba of processing elements 611aa, 611ab, and 611ba of processing die 611, respectively. Likewise, TSV connections 617bb of DRAM memory block 630bb of DRAM die 630 are aligned with the obscured (in FIG. 6) TSV connections of processing element 611bb. Channel connections 650 of DRAM die 630 are aligned with channel connections 675 of processing die 611. Thus, when processing die 611 and DRAM die 630 are stacked with each other, TSV connections 677aa-677bb of processing elements 611aa-61bb of processing die 611 are electrically connected to TSV connections (e.g., 617aa, 617ab, and 617ba) of DRAM blocks 630aa-630bb of DRAM die 630. This is illustrated in FIG. 6 by TSV representations 615aa, 615ab, and 615ba. Likewise, channel connections 650 of DRAM die 630 are electrically connected to channel connections 675 of processing die 611. This is illustrated in FIG. 6 by TSV representation 615.

TSV connections between processing elements 611aa-611bb and DRAM blocks 630aa-630bb allow processing elements 611aa-611bb to access DRAM blocks 630aa-630bb. TSV connections between processing elements 611aa-611bb and DRAM blocks 630aa-630bb allow processing elements 611aa-611bb to access DRAM blocks 630aa-630bb without the data flowing via channel connections 650 and/or channel connections 675. In addition, TSV connections between processing elements 611aa-611bb and DRAM blocks 630aa-630bb allow processing elements 611aa-611bb to access respective DRAM blocks 630aa-630bb independently of each other. Processing elements 611aa-611bb accessing respective DRAM blocks 630aa-630bb independently of each other allow processing elements 611aa-611bb to access respective DRAM blocks 630aa-630bb in parallel—thereby providing a high memory-to-processing element bandwidth and lower latency.

A high memory-to-processing element bandwidth helps speed computations performed by three-dimensional processing arrays and improves the scalability of calculations. For example, in some applications, model parameters (matrix elements, weights, biases, learning rate, etc.) should be quickly swapped to a new calculation (or portion of a calculation.) Otherwise, more time is spent loading parameters and/or data than is spent calculating results. This is also known as the "Batch Size=1 Problem". This may be, for example, particularly problematic in data centers and other shared infrastructure.

In an embodiment, the TSV connections between processing elements 611aa-611bb and DRAM blocks 630aa-630bb of multiple DRAM dies of the stack (not shown in FIG. 6) may be made in a common bus type configuration. In another embodiment, the TSV connections between processing elements 611aa-611bb and DRAM blocks 630aa-630bb of multiple DRAM dies of the stack (not shown in FIG. 8) may be made in a point-to-point bus type configuration.

Assembly 600 provides (at least) two data paths for large-scale data movement. A first path can be configured to move data to processing elements and move output data to storage. In an embodiment, this first path may be provided by channel connections 650 and 675. The processing arrays may be provided by the configuration and interconnection of processing elements 611aa-611bb and DRAM blocks 630aa-630bb, as described herein with reference to at least FIGS. 3A-3E, and FIG. 5.

A second path may be configured to, in parallel, load and/or store data and/or intermediate results to/from multiple processing elements 611aa-611bb through the TSV interconnections (e.g., 615aa, 615ab, and 615ba.) Because each processing element is loading/storing in parallel with the other processing elements 611aa-611bb, systolic array elements, for example, may be updated quickly (relative to using the channel connections 650 and 675.)

FIGS. 7A-7D illustrate example data flows for matrix multiplication. Table 1 illustrates the matrix multiplication formula that corresponds to the operations being partially illustrated in FIGS. 7A-7D. In Table 1, and FIGS. 7A-7D, the elements $a_{xx}$, $b_{xx}$, and $o_{xx}$ of A, B, and O, respectively may be individual elements (e.g., scalars or complex values) and/or submatrices. When $a_{xx}$, $b_{xx}$, or $o_{xx}$ are submatrices, each processing element 711aa-711dc through 712aa-712dc of processing array 700 may be viewed as a vector processor.

TABLE 1

AB = O
Or equivalently:

$$\begin{bmatrix} a_{11} & \cdots & a_{13} \\ \vdots & \ddots & \vdots \\ a_{81} & \cdots & a_{83} \end{bmatrix} \begin{bmatrix} b_{11} & \cdots & b_{18} \\ \vdots & \ddots & \vdots \\ b_{31} & \cdots & b_{38} \end{bmatrix} = \begin{bmatrix} O_{11} & \cdots & O_{18} \\ \vdots & \ddots & \vdots \\ O_{81} & \cdots & O_{88} \end{bmatrix}$$

Figure 7A:
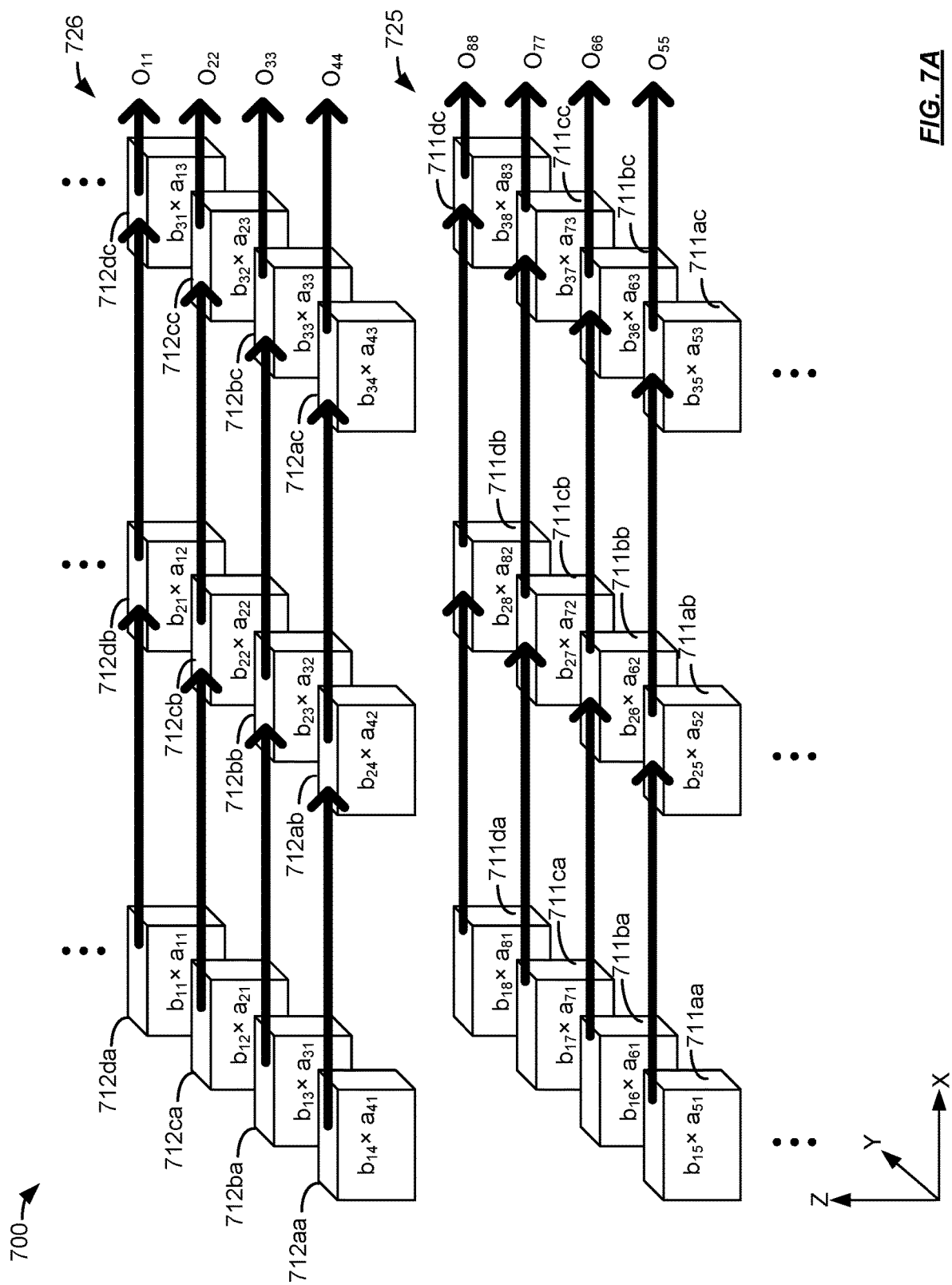
FIGS. 7A-7D illustrate example data flows for matrix multiplication.

In FIG. 7A, the elements of one of the factor matrices (in this example A) is distributed to a corresponding processing element 711aa-711dc through 712aa-712dc of processing array 700. In FIG. 7A, the first row first column element of matrix A (i.e., $a_{11}$) has been provided to processing element 712da, the first row second column element (i.e., $a_{12}$) has been provided to processing element 712db, the first row third column element (i.e., $a_{13}$) has been provided to processing element 712dc, the second row first column element (i.e., $a_{21}$) has been provided to processing element 712ca, and so on such that each processing element on layer 726 has been provisioned with an element of matrix A. Similarly, the fifth row first column element of matrix A (i.e., $a_{51}$) has been provided to processing element 711aa, the fifth row second column element (i.e., $a_{52}$) has been provided to processing element 711ab, the fifth row third column element (i.e., $a_{53}$) has been provided to processing element 711ac, the sixth row first column element (i.e., $a_{61}$) has been provided to processing element 711ba, and so on such that each processing element on layer 725 has been provisioned with an element of matrix A.

Also in FIG. 7A, the first row first column element of matrix B (i.e., $b_{11}$) has been provided to processing element 712da, the second row first column element (i.e., $b_{21}$) has been provided to processing element 712db, the third row first column element (i.e., $b_{31}$) has been provided to processing element 712dc, the first row second column element (i.e., $b_{12}$) has been provided to processing element 712ca, and so on such that each processing element on layer 726 has been provisioned with an element of matrix B. Similarly, the first row fifth column element of matrix B (i.e., $b_{15}$) has been provided to processing element 711aa, the second row fifth column element (i.e., $b_{25}$) has been provided to processing element 71 1ab, the third row fifth column element (i.e., $b_{35}$) has been provided to processing element 711ac, the first row sixth column element (i.e., $b_{16}$) has been provided to processing element 711ba, and so on such that each processing element on layer 725 has been provisioned with an element of matrix B.

Thus, when provisioned, the row of processing elements 712da-712dc have the elements to perform the dot product of the first row of matrix A with the first column of matrix B. The row of processing elements 712ca-712cc have the elements to perform the dot product of the second row of matrix A with the second column of matrix B. The row of processing elements 711aa-712ac have the elements to perform the dot product of the fifth row of matrix A with the fifth column of matrix B, and so on. To perform these dot products, the leftmost processing element multiplies the two elements it has together and passes the result to the right (e.g., processing element 712da passes the product $b_{11} \times a_{11}$ to processing element 712db.) The next processing element to the right multiplies the two elements it has together, sums that with the partial result received from the left, and passes that result to the right (e.g., processing element 712db sums the result from processing element 712da with the product $b_{21} \times a_{12}$ and passes that result to processing element 712dc.) The rightmost processing element of the row produces an element of the result array, O (e.g., processing element 712dc sums the result from processing element 712db with the product $b_{31} \times a_{13}$ and produce the result $O_{11}$.) It should be understood that the operations and data flows illustrated in FIG. 7A produce the diagonal elements of the result matrix O.

Figure 7B:
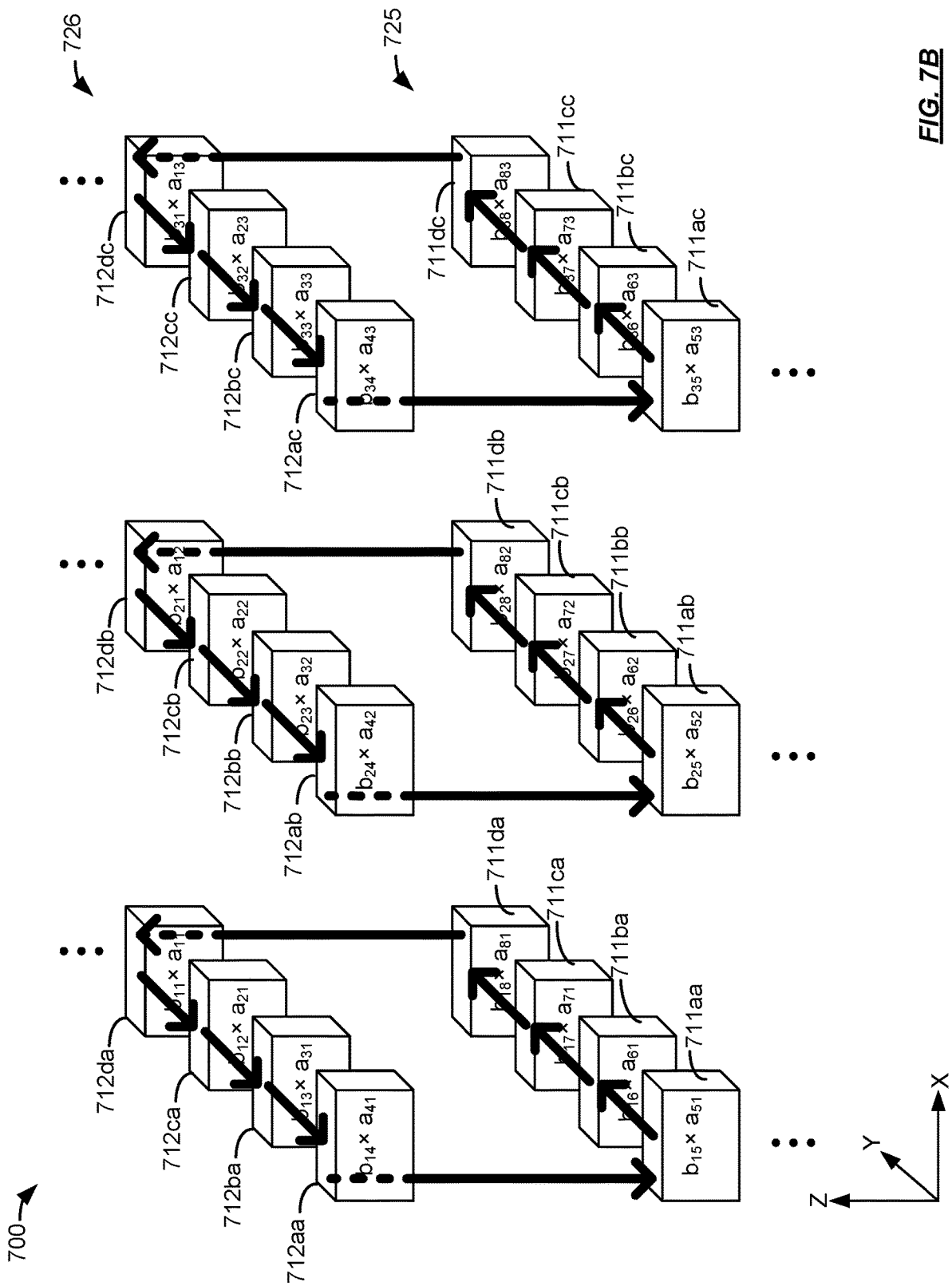

FIG. 7B illustrates data flows to provision processing elements 711aa-711dc through 712aa-712dc to produce additional elements of the result matrix O. In FIG. 7B, each processing element 711aa-711dc through 712aa-712dc passes the element of matrix A to its nearest neighbor in a direction that is perpendicular to the direction the partial results were passed in FIG. 7A. In other words, for example, processing element 712db passes $a_{12}$ to processing element 712cb, processing element 712cb passes $a_{22}$ to processing element 712bb, and so on. The processing elements on the edges of a layer 725-726 pass the element of matrix A they have to the other layer. Thus, for example, processing element 712ab passes $a_{42}$ to processing element 711ab, and processing element 711db passes $a_{82}$ to processing element 712db (thereby forming a looped data flow.)

Figure 7C:
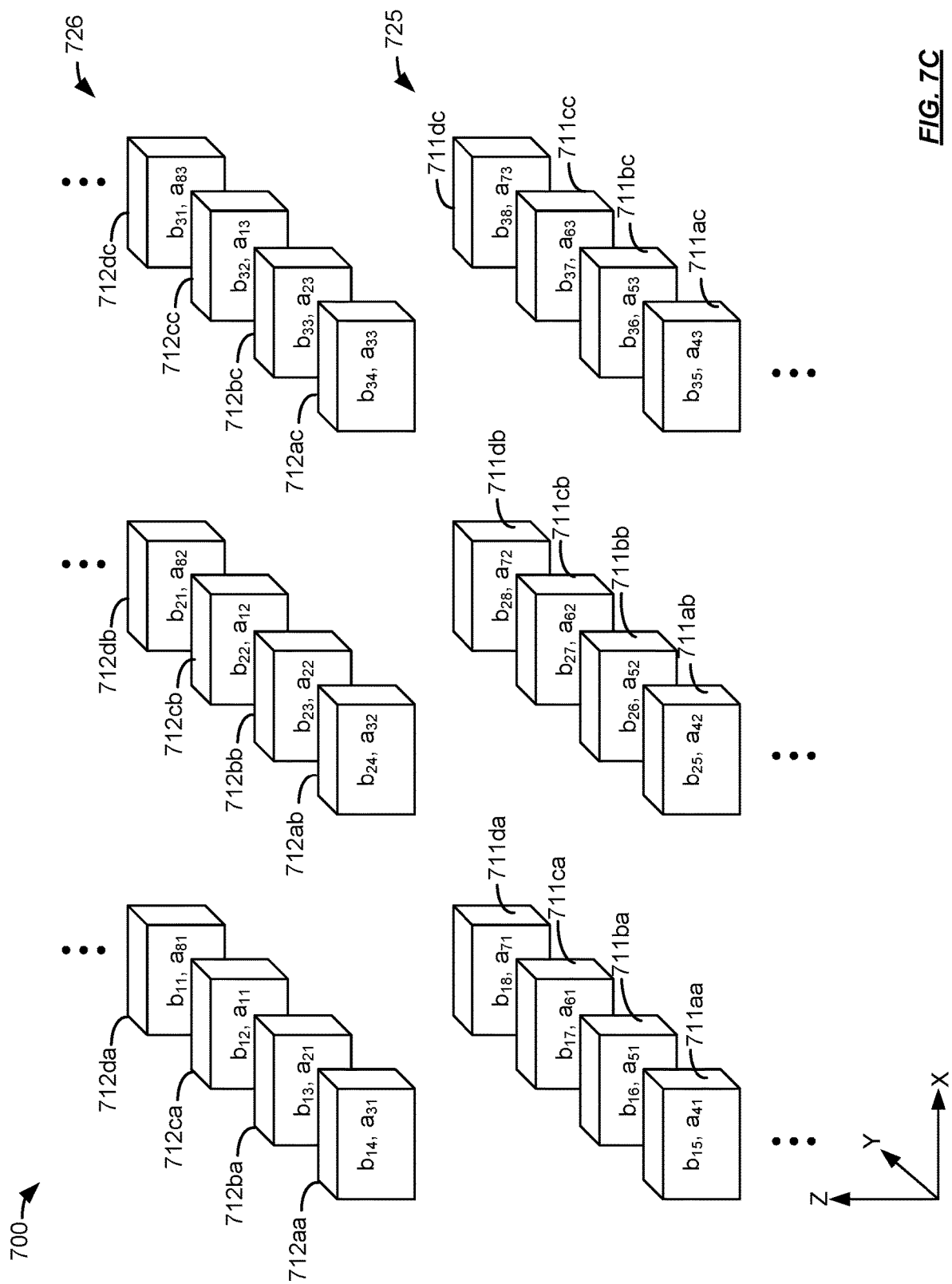
Figure 7D:
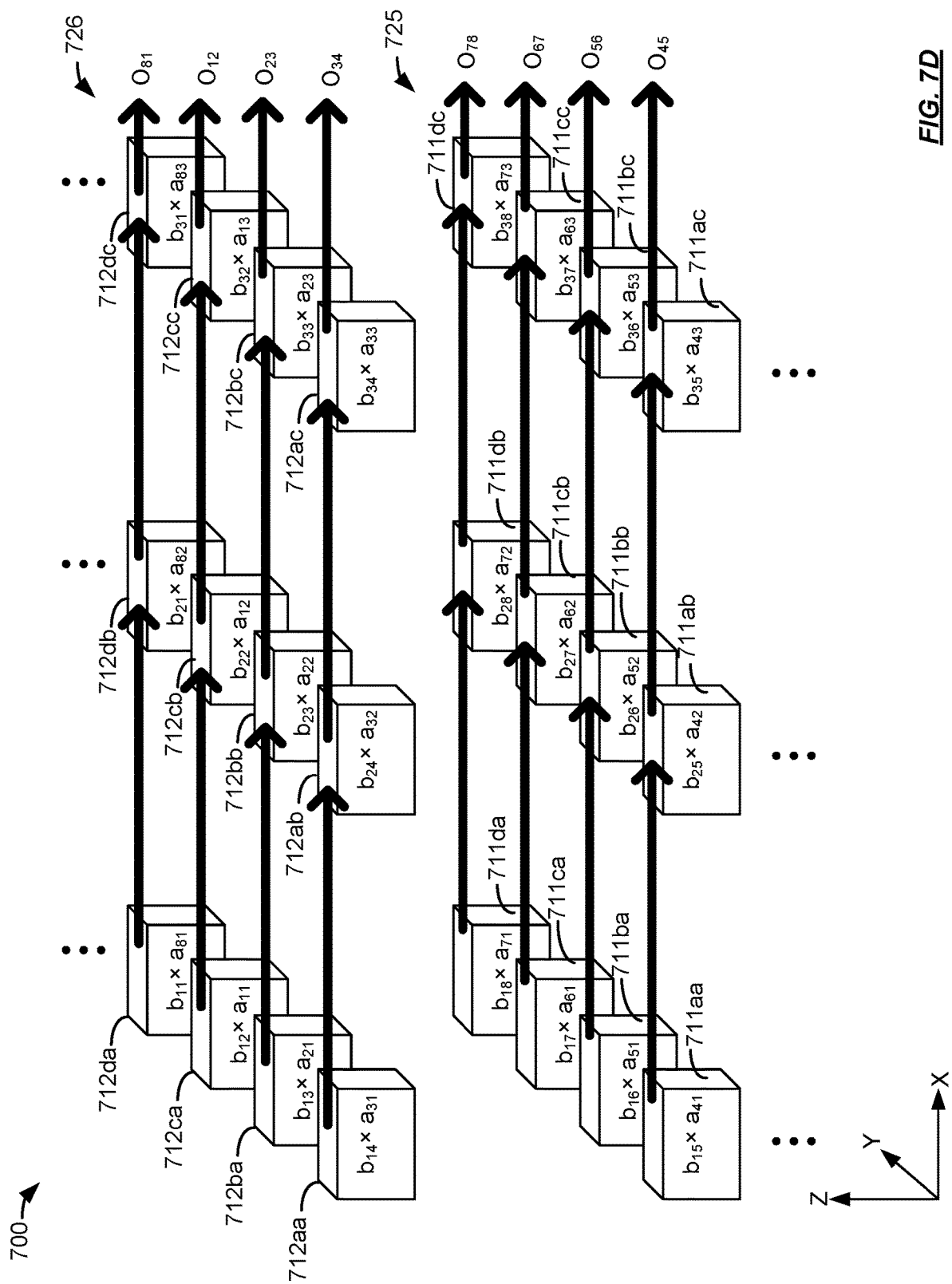

FIG. 7C illustrates the location of the matrix elements after these operations have completed. Processing elements 711aa-711dc through 712aa-712dc may then repeat the operations described with reference to FIG. 7A to produce another set of result matrix elements. This is illustrated in FIG. 7D with processing elements 712da-712dc producing the dot product of the eighth row of matrix A with the first column of matrix B—$O_{81}$. Processing elements 712ca-712cc produce dot product of the first row of matrix A with the second column of matrix B—$O_{12}$. Processing elements 711aa-711ac produce the dot product of the fourth row of matrix A with the fifth column of matrix B ($O_{45}$), and so on.

FIG. 8 is a flowchart illustrating a method of operating a three-dimensional array of processing elements. The steps illustrated in FIG. 8 may be performed by one or more elements of processing system 100, system 200, processing element array 300, processing system 400, processing element array 500, assembly 600, and/or processing array 700. First data is provided to a first processing element of a three-dimensional array of nearest neighbor intercoupled processing elements (802). For example, processing element 312ab may be provisioned with first matrix element.

Second data is provided to a second processing element of the array, the second processing element being adjacently intercoupled to the first processing element in a first dimension (804). For example, processing element 311ab may be provisioned with a second matrix element where processing elements 311ab and 312ab are nearest neighbor intercoupled in the vertical (+Z) direction of the XZ plane.

By the first processing element, the first data is provided to a third processing element of the array, the third processing element adjacently intercoupled to the first processing element in a second dimension, the first data flowing from the first processing element to the third processing element in a first direction along the second dimension (806). For example, processing element 312ab may provide the first matrix element to processing element 312bb by flowing the first matrix element in the front-to-back (+Y) direction of the XY plane.

By a fourth processing element, third data is provided to the second processing element of the array, the fourth processing element adjacently intercoupled to the second processing element in the second dimension, the third data flowing from the fourth processing element to the second processing element in a second direction along the second dimension, the first direction being opposite to the second direction (808). For example, processing element 311bb may provide a third matrix element to processing element 311ab by flowing the third matrix element in the back-to-front (−Y) direction of the XY plane.

FIG. 9 is a flowchart illustrating a method of configuring data flows for a three-dimensional array of processing elements. The steps illustrated in FIG. 9 may be performed by one or more elements of processing system 100, system 200, processing element array 300, processing system 400, processing element array 500, assembly 600, and/or processing array 700. First data is provided to a first processing element of a three-dimensional array of nearest neighbor intercoupled processing elements (902). For example, processing element 312ab may be provisioned with first matrix element.

Second data is provided to a second processing element of the array, the second processing element being adjacently intercoupled to the first processing element in a first dimension (904). For example, processing element 311ab may be provisioned with a second matrix element where processing elements 311ab and 312ab are nearest neighbor intercoupled in the vertical (+Z) direction of the XZ plane.

The first processing element is configured to provide the first data to a third processing element of the array in a first direction along a second dimension, the third processing element adjacently intercoupled to the first processing element in the second dimension (906). For example, processing element 312ab may be configured to provide the first matrix element to processing element 312bb by flowing the first matrix element in the front-to-back (+Y) direction of the XY plane.

A fourth processing element is configured to provide third data to the second processing element of the array in a second direction along the second dimension where the first direction is opposite to the second direction and the fourth processing element is adjacently intercoupled to the second processing element in the second dimension (908). For example, processing element 311bb may be configured to provide a third matrix element to processing element 311ab by flowing the third matrix element in the back-to-front (−Y) direction of the XY plane.

The methods, systems and devices described above may be implemented in computer systems, or stored by computer systems. The methods described above may also be stored on a non-transitory computer readable medium. Devices, circuits, and systems described herein may be implemented using computer-aided design tools available in the art, and embodied by computer-readable files containing software descriptions of such circuits. This includes, but is not limited to one or more elements of processing system 100, system 200, processing element array 300, processing system 400, processing element array 500, assembly 600, and/or processing array 700, and their components. These software descriptions may be: behavioral, register transfer, logic component, transistor, and layout geometry-level descriptions. Moreover, the software descriptions may be stored on storage media or communicated by carrier waves.

Data formats in which such descriptions may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email. Note that physical files may be implemented on machine-readable media such as: 4 mm magnetic tape, 8 mm magnetic tape, 3½ inch floppy media, CDs, DVDs, and so on.

Figure 10:
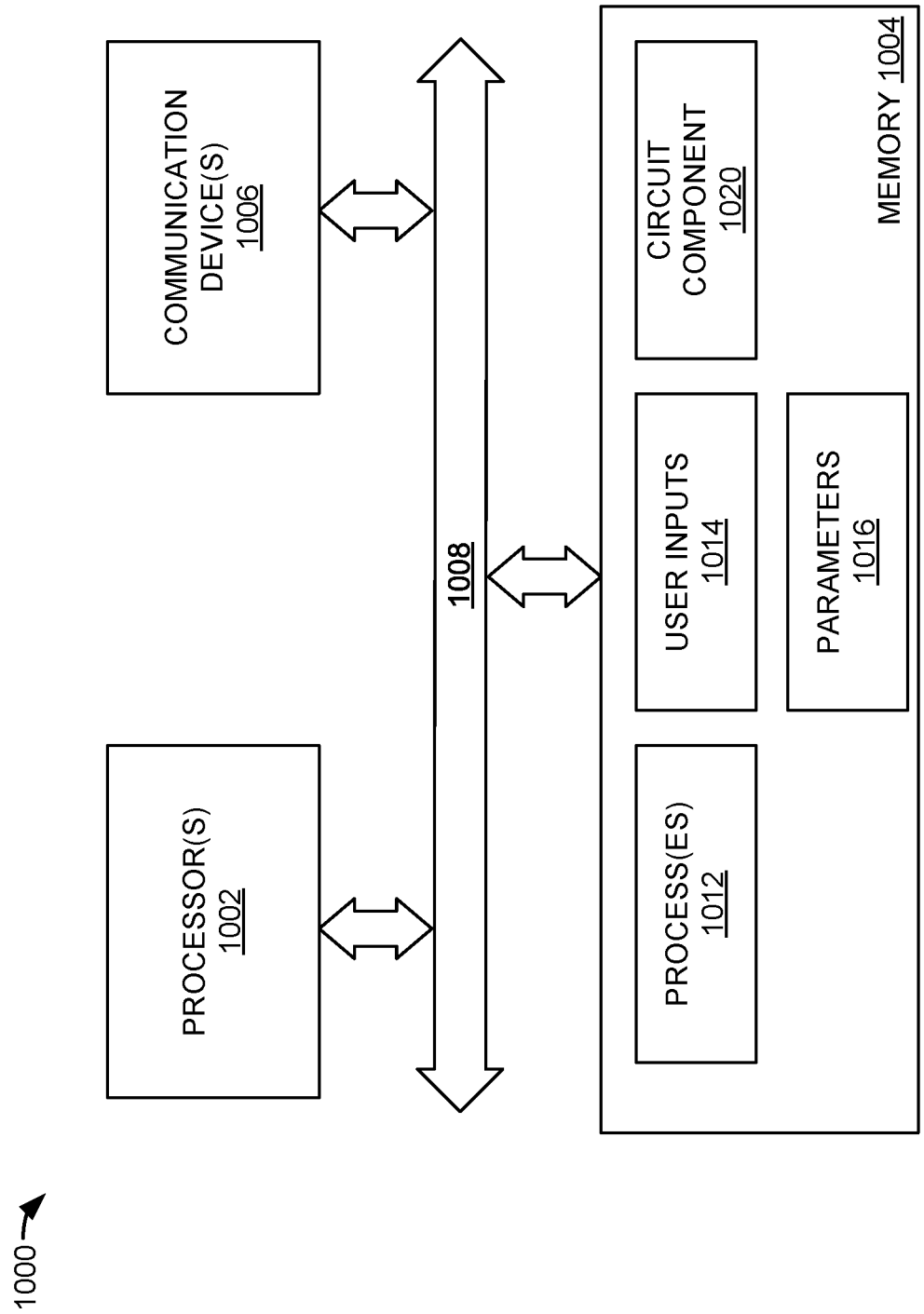
FIG. 10 is a block diagram of a processing system.

FIG. 10 is a block diagram illustrating one embodiment of a processing system 1000 for including, processing, or generating, a representation of a circuit component 1020. Processing system 1000 includes one or more processors 1002, a memory 1004, and one or more communications devices 1006. Processors 1002, memory 1004, and communications devices 1006 communicate using any suitable type, number, and/or configuration of wired and/or wireless connections 1008.

Processors 1002 execute instructions of one or more processes 1012 stored in a memory 1004 to process and/or generate circuit component 1020 responsive to user inputs 1014 and parameters 1016. Processes 1012 may be any suitable electronic design automation (EDA) tool or portion thereof used to design, simulate, analyze, and/or verify electronic circuitry and/or generate photomasks for electronic circuitry. Representation 1020 includes data that describes all or portions of processing system 100, system 200, processing element array 300, processing system 400, processing element array 500, assembly 600, and/or processing array 700, and their components, as shown in the Figures.

Representation 1020 may include one or more of behavioral, register transfer, logic component, transistor, and layout geometry-level descriptions. Moreover, representation 1020 may be stored on storage media or communicated by carrier waves.

Data formats in which representation 1020 may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email.

User inputs 1014 may comprise input parameters from a keyboard, mouse, voice recognition interface, microphone and speakers, graphical display, touch screen, or other type of user interface device. This user interface may be distributed among multiple interface devices. Parameters 1016 may include specifications and/or characteristics that are input to help define representation 1020. For example, parameters 1016 may include information that defines device types (e.g., NFET, PFET, etc.), topology (e.g., block diagrams, circuit descriptions, schematics, etc.), and/or device descriptions (e.g., device properties, device dimensions, power supply voltages, simulation temperatures, simulation models, etc.).

Memory 1004 includes any suitable type, number, and/or configuration of non-transitory computer-readable storage media that stores processes 1012, user inputs 1014, parameters 1016, and circuit component 1020.

Communications devices 1006 include any suitable type, number, and/or configuration of wired and/or wireless devices that transmit information from processing system 1000 to another processing or storage system (not shown) and/or receive information from another processing or storage system (not shown). For example, communications devices 1006 may transmit circuit component 1020 to another system. Communications devices 1006 may receive processes 1012, user inputs 1014, parameters 1016, and/or circuit component 1020 and cause processes 1012, user inputs 1014, parameters 1016, and/or circuit component 1020 to be stored in memory 1004.

Implementations discussed herein include, but are not limited to, the following examples:

Example 1: A system, comprising: a plurality of processing element units and associated memory units arranged in a three-dimensional matrix; and, data intercoupling arranged to communicate data with respective ones of the plurality of processing element units and nearest neighbor processing element units in vertical and horizontal directions, the data intercoupling to accumulate partial sums to use as intermediate results of matrix multiplication operations, data used by the processing element units to flow, in at least one dimension, in opposite directions between adjacent processing element units.

Example 2: The system of example 1, wherein the data flowing in opposite directions between adjacent processing element units flows in a loop.

Example 3: The system of example 2, wherein, proximate to at least two opposite edges of the three-dimensional matrix, through-silicon vias (TSVs) are used to communicate the data flowing in the loop between adjacent processing element units.

Example 4: The system of example 2, wherein the data used by the processing element units includes the partial sums.

Example 5: The system of example 1, wherein each of the plurality of processing element units are on a same integrated circuit die as the associated memory unit associated with that respective processing element unit.

Example 6: The system of example 1, wherein each of the plurality of processing element units is on a different integrated circuit die from the associated memory unit associated with that respective processing element unit.

Example 7: The system of example 1, wherein each of the plurality of processing element units is coupled to the associated memory unit associated with that respective processing element unit by through-silicon vias (TSVs).

Example 8: An assembly, comprising: a plurality of stacked integrated circuit dies, the plurality of stacked integrated circuit dies including: at least two processing element integrated circuit dies, the processing element integrated circuit dies including a plurality of processing element units intercoupled to nearest neighbor processing element units on a same integrated circuit die in a two-dimensional array arrangement of intercoupled processing element units; the at least two processing element integrated circuit dies intercoupled, by intercoupling circuitry, to nearest neighbor processing element units on different processing element integrated circuit dies in a three-dimensional array arrangement of intercoupled processing element units; and, the intercoupling circuitry to communicate partial sums to use as intermediate results of matrix multiplication operations, data used by the processing element units to flow, in at least one dimension, in opposite directions between adjacently intercoupled processing element units.

Example 9: The assembly of example 8, wherein the plurality of processing element units include memory units.

Example 10: The assembly of example 8, wherein the plurality of stacked integrated circuit dies include: at least two memory unit integrated circuit dies, the memory unit integrated circuit dies including a plurality of memory units intercoupled to respective processing element units.

Example 11: The assembly of example 10, wherein the plurality of stacked integrated circuit dies includes a base die intercoupled to at least two memory unit integrated circuit dies by way of through-silicon vias (TSVs).

Example 12: The assembly of example 8, wherein the plurality of stacked integrated circuit dies includes a base die intercoupled to the at least two processing element integrated circuit dies by way of through-silicon vias (TSVs).

Example 13: The assembly of example 8, wherein the data flowing in opposite directions between the adjacently intercoupled processing element units flows in a loop.

Example 14: The assembly of example 13, wherein, proximate to at least two opposite edges of three-dimensional array arrangement of intercoupled processing element units, through-silicon vias (TSVs) are used to communicate the data flowing in the loop between adjacently intercoupled processing element units.

Example 15: The assembly of example 13, wherein the data flowing in opposite directions between adjacently coupled processing element units includes the partial sums.

Example 16: A method of operating an array of nearest neighbor intercoupled processing elements that are intercoupled in a three-dimensional arrangement, comprising: providing first data to a first processing element of the array; providing second data to a second processing element of the array, the second processing element of the array adjacently intercoupled to the first processing element in a first dimension; providing, by the first processing element of the array, the first data to a third processing element of the array, the third processing element of the array adjacently intercoupled to the first processing element in a second dimension, the first data flowing from the first processing element to the third processing element in a first direction along the second dimension; and, providing, by a fourth processing element of the array, third data to the second processing element of the array, the fourth processing element of the array adjacently intercoupled to the second processing element in the second dimension, the second data flowing from the fourth processing element to the second processing element in a second direction along the second dimension, the first direction being opposite to the second direction.

Example 17: The method of example 16, further comprising: providing, along the first direction, the first data to a fifth processing element; and, providing, by the fifth processing element and by way of first through-silicon vias, the first data to a sixth processing element, the first data flowing from the fifth processing element to the sixth processing element in a third direction along the first dimension.

Example 18: The method of example 17, further comprising: providing, along the second direction, the second data to a seventh processing element; and, providing, by the seventh processing element and by way of second through-silicon vias, the second data to an eighth processing element, the second data flowing from the seventh processing element to the eighth processing element in a fourth direction along the first dimension, the third direction being opposite to the fourth direction.

Example 19: The method of example 16, further comprising: providing, by the first processing element, a first partial sum to a fifth processing element of the array, the fifth processing element of the array adjacently coupled to the first processing element in a third dimension, the first partial sum flowing from the first processing element to the fifth processing element in a third direction along the third dimension.

Example 20: The method of example 19, further comprising: providing, by the second processing element, a second partial sum to a sixth processing element of the array, the sixth processing element of the array adjacently coupled to the second processing element in the third dimension, the second partial sum flowing from the second processing element to the sixth processing element in the third direction along the third dimension.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A system, comprising:
a plurality of processing element units and associated memory units arranged in a three-dimensional matrix; and,
hardware data intercoupling arranged to communicate data with respective ones of the plurality of processing element units and nearest neighbor processing element units in vertical and horizontal directions, the hardware data intercoupling to accumulate partial sums to use as intermediate results of matrix multiplication operations, data used by the processing element units to flow, in at least one dimension, in opposite directions between adjacent processing element units.

2. The system of claim 1, wherein the data flowing in opposite directions between adjacent processing element units flows in a loop.

3. The system of claim 2, wherein, proximate to at least two opposite edges of the three-dimensional matrix, through-silicon vias (TSVs) are used to communicate the data flowing in the loop between adjacent processing element units.

4. The system of claim 2, wherein the data used by the processing element units includes the partial sums.

5. The system of claim 1, wherein each of the plurality of processing element units is on a same integrated circuit die as the associated memory unit associated with that respective processing element unit.

6. The system of claim 1, wherein each of the plurality of processing element units is on a different integrated circuit die from the associated memory unit associated with that respective processing element unit.

7. The system of claim 1, wherein each of the plurality of processing element units is coupled to the associated memory unit associated with that respective processing element unit by through-silicon vias (TSVs).

8. An assembly, comprising:
a plurality of stacked integrated circuit dies, the plurality of stacked integrated circuit dies including:
at least two processing element integrated circuit dies, the at least two processing element integrated circuit dies including a plurality of processing element units intercoupled to nearest neighbor processing element units on a same integrated circuit die in a two-dimensional array arrangement of intercoupled processing element units;
the at least two processing element integrated circuit dies intercoupled, by hardware intercoupling circuitry, to nearest neighbor processing element units on different processing element integrated circuit dies in a three-dimensional array arrangement of intercoupled processing element units; and,
the hardware intercoupling circuitry to communicate partial sums to use as intermediate results of matrix multiplication operations, data used by the processing element units to flow, in at least one dimension, in opposite directions between adjacently intercoupled processing element units.

9. The assembly of claim 8, wherein the plurality of processing element units include memory units.

10. The assembly of claim 8, wherein the plurality of stacked integrated circuit dies include:
at least two memory unit integrated circuit dies, the at least two memory unit integrated circuit dies including a plurality of memory units intercoupled to respective processing element units.

11. The assembly of claim 10, wherein the plurality of stacked integrated circuit dies includes a base die intercoupled to the at least two memory unit integrated circuit dies by way of through-silicon vias (TSVs).

12. The assembly of claim 8, wherein the plurality of stacked integrated circuit dies includes a base die intercoupled to the at least two processing element integrated circuit dies by way of through-silicon vias (TSVs).

13. The assembly of claim 8, wherein the data flowing in opposite directions between the adjacently intercoupled processing element units flows in a loop.

14. The assembly of claim 13, wherein, proximate to at least two opposite edges of the three-dimensional array arrangement of intercoupled processing element units, through-silicon vias (TSVs) are used to communicate the data flowing in the loop between the adjacently intercoupled processing element units.

15. The assembly of claim 13, wherein the data flowing in opposite directions between the adjacently intercoupled processing element units includes the partial sums.

16. A method of operating an array of nearest neighbor intercoupled processing elements that are intercoupled in a three-dimensional arrangement, comprising:
providing first data to a first processing element of the array;
providing second data to a second processing element of the array, the second processing element of the array adjacently intercoupled to the first processing element in a first dimension;
providing, by the first processing element of the array, the first data to a third processing element of the array, the third processing element of the array adjacently intercoupled to the first processing element in a second dimension, the first data flowing from the first processing element to the third processing element in a first direction along the second dimension; and,
providing, by a fourth processing element of the array, third data to the second processing element of the array, the fourth processing element of the array adjacently intercoupled to the second processing element in the second dimension, the third data flowing from the fourth processing element to the second processing element in a second direction along the second dimension, the first direction being opposite to the second direction.

17. The method of claim 16, further comprising:
providing, along the first direction, the first data to a fifth processing element; and,
providing, by the fifth processing element and by way of first through-silicon vias, the first data to a sixth processing element, the first data flowing from the fifth processing element to the sixth processing element in a third direction along the first dimension.

18. The method of claim 17, further comprising:
providing, along the second direction, the second data to a seventh processing element; and,
providing, by the seventh processing element and by way of second through-silicon vias, the second data to an eighth processing element, the second data flowing from the seventh processing element to the eighth processing element in a fourth direction along the first dimension, the third direction being opposite to the fourth direction.

19. The method of claim 16, further comprising:
providing, by the first processing element, a first partial sum to a fifth processing element of the array, the fifth processing element of the array adjacently intercoupled to the first processing element in a third dimension, the first partial sum flowing from the first processing element to the fifth processing element in a third direction along the third dimension.

20. The method of claim 19, further comprising:
providing, by the second processing element, a second partial sum to a sixth processing element of the array, the sixth processing element of the array adjacently intercoupled to the second processing element in the third dimension, the second partial sum flowing from the second processing element to the sixth processing element in the third direction along the third dimension.

* * * * *